(12) United States Patent
Gotrik et al.

(10) Patent No.: US 12,271,010 B2
(45) Date of Patent: Apr. 8, 2025

(54) RETROREFLECTIVE ARTICLE COMPRISING LOCALLY-LAMINATED REFLECTIVE LAYERS

(71) Applicant: 3M INNOVATIVE PROPERTIES COMPANY, St. Paul, MN (US)

(72) Inventors: Kevin W. Gotrik, Hudson, WI (US); Kui Chen-Ho, Woodbury, MN (US); Scott J. Jones, Woodbury, MN (US); Michael A McCoy, St. Paul, MN (US); Christopher A. Merton, St. Louis Park, MN (US); Shri Niwas, Maple Grove, MN (US); Ramasubramani Kuduva Raman Thanumoorthy, Woodbury, MN (US); Ying Xia, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 421 days.

(21) Appl. No.: 17/742,867

(22) Filed: May 12, 2022

(65) Prior Publication Data

US 2022/0276417 A1 Sep. 1, 2022

Related U.S. Application Data

(63) Continuation of application No. 15/733,033, filed as application No. PCT/US2018/057553 on Oct. 25, 2018, now Pat. No. 11,366,252.
(Continued)

(51) Int. Cl.
*G02B 5/128* (2006.01)
*A41D 31/32* (2019.01)
(Continued)

(52) U.S. Cl.
CPC ........... *G02B 5/128* (2013.01); *A41D 31/325* (2019.02); *B32B 37/0076* (2013.01);
(Continued)

(58) Field of Classification Search
CPC ...... A41D 31/325; G02B 5/128; C03C 12/02; B32B 2037/268; B32B 2305/073;
(Continued)

(56) References Cited

U.S. PATENT DOCUMENTS

| 1,175,224 A | 3/1916 | Bleecker |
| 2,461,011 A | 8/1949 | Taylor et al. |

(Continued)

FOREIGN PATENT DOCUMENTS

| CN | 104635286 A | 5/2015 |
| CN | 204719258 U | 10/2015 |

(Continued)

OTHER PUBLICATIONS

Search Opinion for EP18869550.*
(Continued)

*Primary Examiner* — Sonya M Sengupta
(74) *Attorney, Agent, or Firm* — Kenneth B. Wood

(57) ABSTRACT

A retroreflective article including a binder layer and a plurality of retroreflective elements. Each retroreflective element includes a transparent microsphere partially embedded in the binder layer. At least some of the retroreflective elements include a reflective layer that is a locally-laminated reflective layer that is embedded between the transparent microsphere and the binder layer. At least some of the locally-laminated reflective layers may be localized reflective layers.

20 Claims, 12 Drawing Sheets

Related U.S. Application Data

(60) Provisional application No. 62/739,506, filed on Oct. 1, 2018, provisional application No. 62/578,343, filed on Oct. 27, 2017.

(51) Int. Cl.
*B32B 37/00* (2006.01)
*B32B 37/26* (2006.01)
*B32B 38/10* (2006.01)
*C03C 12/02* (2006.01)

(52) U.S. Cl.
CPC ............ *B32B 37/025* (2013.01); *B32B 38/10* (2013.01); *C03C 12/02* (2013.01); *B32B 2037/268* (2013.01); *B32B 2305/073* (2013.01); *B32B 2305/30* (2013.01); *B32B 2307/416* (2013.01)

(58) Field of Classification Search
CPC .......... B32B 2305/30; B32B 2307/416; B32B 37/0076; B32B 37/025; B32B 38/10
See application file for complete search history.

(56) References Cited

U.S. PATENT DOCUMENTS

| | | | |
|---|---|---|---|
| 2,543,800 A | 3/1951 | Palmquist et al. | |
| 2,726,161 A | 12/1955 | Beck et al. | |
| 2,842,446 A | 7/1958 | Beck et al. | |
| 2,853,393 A | 9/1958 | Beck et al. | |
| 2,870,030 A | 1/1959 | Stradley et al. | |
| 2,939,797 A | 6/1960 | Rindone | |
| 2,963,378 A | 12/1960 | Palmquist | |
| 2,965,921 A | 12/1960 | Bland | |
| 2,992,122 A | 7/1961 | Beck et al. | |
| 3,228,897 A | 1/1966 | Nellessen | |
| 3,294,559 A | 12/1966 | Searight et al. | |
| 3,468,681 A | 9/1969 | Jaupain | |
| 3,700,305 A | 10/1972 | Bingham | |
| 3,758,192 A | 9/1973 | Bingham | |
| 3,946,130 A | 3/1976 | Tung et al. | |
| 3,989,775 A | 11/1976 | Jack et al. | |
| 4,192,576 A | 3/1980 | Tung et al. | |
| 4,367,919 A | 1/1983 | Tung et al. | |
| 4,564,556 A | 1/1986 | Lange | |
| 4,758,469 A | 7/1988 | Lange | |
| 4,763,985 A * | 8/1988 | Bingham ............... | G02B 5/128 359/518 |
| 4,772,511 A | 9/1988 | Wood et al. | |
| 4,897,136 A | 1/1990 | Bailey et al. | |
| 4,931,414 A | 6/1990 | Wood et al. | |
| 5,064,272 A * | 11/1991 | Bailey ..................... | G02B 5/128 359/541 |
| 5,200,262 A | 4/1993 | Li | |
| 5,223,276 A | 6/1993 | Djordjevic et al. | |
| 5,286,682 A | 2/1994 | Jacobs et al. | |
| 5,344,705 A * | 9/1994 | Olsen .................... | B44C 1/1716 428/207 |
| 5,510,178 A | 4/1996 | Olsen et al. | |
| 5,631,064 A | 5/1997 | Marecki | |
| 5,645,938 A | 7/1997 | Crandall | |
| 5,866,236 A | 2/1999 | Faykish et al. | |
| 5,962,121 A | 10/1999 | Mori | |
| 5,976,669 A | 11/1999 | Fleming | |
| 6,153,128 A | 11/2000 | Lightle et al. | |
| 6,172,810 B1 | 1/2001 | Fleming et al. | |
| 6,224,219 B1 | 5/2001 | Fleming et al. | |
| 6,243,201 B1 | 6/2001 | Fleming et al. | |
| 6,306,459 B1 | 10/2001 | Fleming | |
| 6,350,034 B1 | 2/2002 | Fleming et al. | |
| 6,355,302 B1 | 3/2002 | Vandenberg et al. | |
| 6,416,856 B1 | 7/2002 | Crandall | |
| 7,018,713 B2 | 3/2006 | Padiyath et al. | |
| 7,140,741 B2 | 11/2006 | Fleming et al. | |
| 7,175,901 B1 | 2/2007 | Sagar | |
| 7,651,557 B2 | 1/2010 | Burns et al. | |
| 8,234,998 B2 | 8/2012 | Krogman et al. | |
| 8,470,394 B2 | 6/2013 | Koppes et al. | |
| 8,658,248 B2 | 2/2014 | Anderson et al. | |
| 8,851,688 B2 | 10/2014 | Huang et al. | |
| 9,234,990 B2 | 1/2016 | Huang et al. | |
| 9,248,470 B2 | 2/2016 | Koppes et al. | |
| 9,327,441 B2 | 5/2016 | Ulcej et al. | |
| 9,671,533 B2 | 6/2017 | Hannington | |
| 2001/0026860 A1 | 10/2001 | Benson et al. | |
| 2006/0237124 A1 | 10/2006 | Bartoli et al. | |
| 2009/0035520 A1 | 2/2009 | Sagar et al. | |
| 2009/0142486 A1 | 6/2009 | Hannington | |
| 2010/0316852 A1 | 12/2010 | Condo et al. | |
| 2011/0292508 A1 | 12/2011 | Huang et al. | |
| 2012/0019607 A1 | 1/2012 | Dunn et al. | |
| 2013/0273242 A1 | 10/2013 | Krogman et al. | |
| 2016/0102432 A1 | 4/2016 | Chen et al. | |
| 2016/0170104 A1 | 6/2016 | Nand et al. | |
| 2016/0245966 A1 | 8/2016 | Edwards et al. | |
| 2017/0131444 A1 | 5/2017 | Xia et al. | |
| 2017/0192142 A1 | 7/2017 | Niwas et al. | |
| 2017/0293056 A1 | 10/2017 | Chen-Ho et al. | |
| 2022/0276417 A1* | 9/2022 | Gotrik .................. | B32B 37/025 |

FOREIGN PATENT DOCUMENTS

| | | |
|---|---|---|
| EP | 0404539 A2 | 12/1990 |
| EP | 0512668 A2 | 11/1992 |
| GB | 962570 A | 7/1964 |
| GB | 1036392 A | 7/1966 |
| GB | 1447585 A | 8/1976 |
| GB | 2433637 A | 6/2007 |
| WO | 1996016343 A1 | 5/1996 |
| WO | 1998028642 A1 | 7/1998 |
| WO | 1999036248 A2 | 7/1999 |
| WO | 2001029587 A1 | 4/2001 |
| WO | 2001042823 A1 | 6/2001 |
| WO | 102004025325 A1 | 12/2005 |
| WO | 2009133876 A1 | 11/2009 |
| WO | 2010006102 A2 | 1/2010 |
| WO | 2015061065 A1 | 4/2015 |
| WO | 2015167947 A1 | 11/2015 |
| WO | 2015171406 A1 | 11/2015 |
| WO | 2015175024 A2 | 11/2015 |
| WO | 2016039820 A1 | 3/2016 |
| WO | 2016053734 A1 | 4/2016 |
| WO | 2018151759 A1 | 8/2018 |
| WO | 2018151760 A1 | 8/2018 |
| WO | 2018178802 A1 | 10/2018 |
| WO | 2018178803 A1 | 10/2018 |
| WO | 2019084287 A1 | 5/2019 |
| WO | 2019084295 A1 | 5/2019 |
| WO | 2019084297 A2 | 5/2019 |
| WO | 2019084299 A1 | 5/2019 |
| WO | 2019084302 A1 | 5/2019 |

OTHER PUBLICATIONS

Brilliant Silver Foil 212, Foil Stamp Solutions, [retrieved from the internet on Jun. 23, 2020], URL <http://foilstampsolutions.com/foils/hot-stamp-foil/brilliant-silver-foil-212/>, 2020, pp. 1-2.
Decher, "Fuzzy Nanoassemblies: Toward Layered Polymeric Multicomposites", Science, Aug. 29, 1997, vol. 227, No. 5330, pp. 1232-1237.
Goldstein, "Backscattered Electrons", Scanning Electron Microscopy and X-Ray Microanalysis, Chemistry and Materials Science, 2018, pp. 15-28.
Iler, "Multilayers of Colloidal Particles", Journal of Colloid and Interface Science, 1966, vol. 21, No. 06, pp. 569-594.
International Search Report for PCT International Application No. PCT-US2018-057553, mailed on Jan. 25, 2019, 4 pages.
Krogman, "Automated Process for Improved Uniformity and Versatility of Layer-by-Layer Deposition", Langmuir, 2007, vol. 23, No. 06, pp. 3137-3141.
Schroder, "Broadcast Photonic Curing of Metallic Nanoparticle Films", NSTI—Nanotech Proceedings, 2006, vol. 3, pp. 198-201.

(56) References Cited

OTHER PUBLICATIONS

Seyrek, "Layer-by-Layer Assembly of Multifunctional Hybrid Materials and Nanoscale Devices", Polymer Science: A Comprehensive Reference, 2012, vol. 7, pp. 159-185.

* cited by examiner

RETROREFLECTIVE ARTICLE COMPRISING LOCALLY-LAMINATED REFLECTIVE LAYERS

BACKGROUND

Retroreflective materials have been developed for a variety of applications. Such materials are often used e.g. as high visibility trim materials in clothing to increase the visibility of the wearer. For example, such materials are often added to garments that are worn by firefighters, rescue personnel, road workers, and the like.

SUMMARY

In broad summary, herein is disclosed a retroreflective article comprising a binder layer and a plurality of retroreflective elements. Each retroreflective element comprises a transparent microsphere partially embedded in the binder layer. At least some of the retroreflective elements comprise a reflective layer that is a locally-laminated reflective layer that is embedded between the transparent microsphere and the binder layer. At least some of the locally-laminated reflective layers may be localized reflective layers. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all non-photographic figures and drawings in this document are not to scale and are chosen for the purpose of illustrating different embodiments of the invention. In particular the dimensions of the various components are depicted in illustrative terms only, and no relationship between the dimensions, relative curvatures, etc. of the various components should be inferred from the drawings, unless so indicated.

Figure 1:
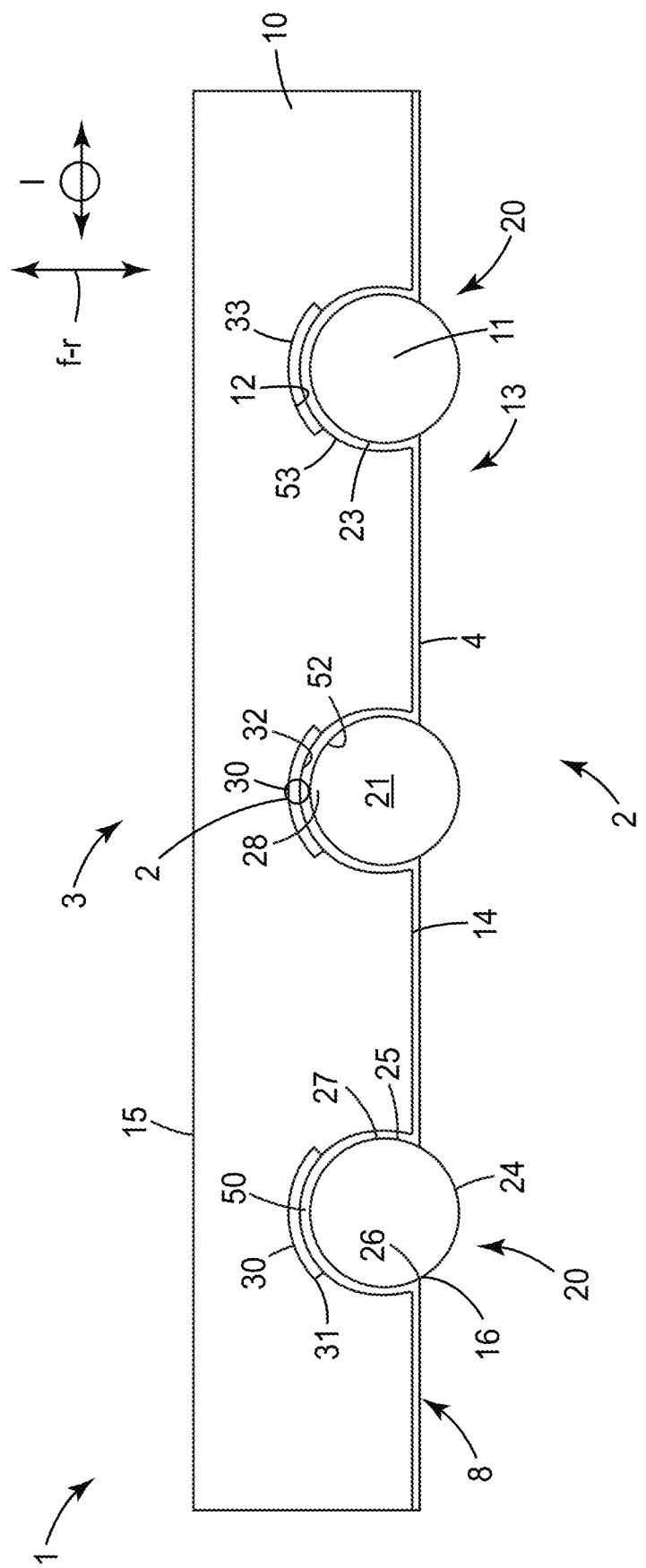
FIG. 1 is a side schematic cross sectional view of an exemplary retroreflective article.

As used herein, terms such as "front", "forward", and the like, refer to the side from which a retroreflective article is to be viewed. Terms such as "rear", "rearward", and the like, refer to an opposing side, e.g. a side that is to be coupled to a garment. The term "lateral" refers to any direction that is perpendicular to the front-rear direction of the article, and includes directions along both the length and the breadth of the article. The front-rear direction (f-r), and exemplary lateral directions (l) of an exemplary article are indicated in FIG. 1.

Terms such as disposed, on, upon, atop, between, behind, adjacent, contact, proximate, and the like, do not require that a first entity (e.g. a layer) must necessarily be in direct contact with a second entity (e.g. a second layer) that the first entity is e.g. disposed on, behind, adjacent, or in contact with. Rather, such terminology is used for convenience of description and allows for the presence of an additional entity (e.g. a layer such as a bonding layer) or entities therebetween, as will be clear from the discussions herein.

As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). For angular orientations, the term "generally" means within clockwise or counterclockwise 10 degrees. The term "substantially", unless otherwise specifically defined, means to a high degree of approximation (e.g., within +/−10% for quantifiable properties). For angular orientations, the term "substantially" means within clockwise or counterclockwise 5 degrees. The term "essentially" means to a very high degree of approximation (e.g., within plus or minus 2% for quantifiable properties; within plus or minus 2 degrees for angular orientations); it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. The term "configured to" and like terms is at least as restrictive as the term "adapted to", and requires actual design intention to perform the specified function rather than mere physical capability of performing such a function. All references herein to numerical parameters (dimensions, ratios, and so on) are understood to be calculable (unless otherwise noted) by the use of average values derived from a number of measurements of the parameter. All averages referred to herein are number-average unless otherwise specified.

DETAILED DESCRIPTION

FIG. 1 illustrates a retroreflective article 1 in exemplary embodiment. As shown in FIG. 1, article 1 comprises a binder layer 10 that comprises a plurality of retroreflective elements 20 spaced over the length and breadth of a front side of binder layer 10. Each retroreflective element comprises a transparent microsphere 21 that is partially embedded in binder layer 10 so that the microspheres 21 are partially exposed and define a front (viewing) side 2 of the article. The transparent microspheres thus each have an embedded area 25 that is seated in a receiving cavity 11 of binder layer 10, and an exposed area 24 that is exposed (protrudes) forwardly of major front surface 14 of binder layer 10. In some embodiments, the exposed areas 24 of microspheres 21 of article 1 are exposed to an ambient atmosphere (e.g., air) in the final article as-used, rather than being e.g. covered with any kind of cover layer or the like. Such an article will be termed an exposed-lens retroreflective article. In various embodiments, a microsphere may be partially embedded in the binder layer so that on average, from 15, 20 or 30 percent of the diameter of the microsphere, to about 80, 70, 60 or 50 percent of the diameter of the microsphere, is embedded within binder layer 10. In many embodiments, a microsphere may be partially embedded in the binder layer so that, on average, from 50 percent to 80 percent of the diameter of the microsphere is embedded within binder layer 10.

A retroreflective element 20 will comprise a reflective layer 30 disposed between the transparent microsphere 21 of the retroreflective element and the binder layer 10. The microspheres 21 and the reflective layers 30 collectively return a substantial quantity of incident light towards a source of light that impinges on front side 2 of article 1. That is, light that strikes the retroreflective article's front side 2 passes into and through a microsphere 21 and is reflected by the reflective layer 30 to again reenter the microsphere 21 such that the light is steered to return toward the light source.

Locally-Laminated Reflective Layers

A retroreflective article 1 as disclosed herein will include at least some retroreflective elements 20 in which the reflective layer 30 of the retroreflective element 20 is a locally-laminated reflective layer. In various embodiments, at least 5, 10, 20, 40, 60, 80, 90, 95, 98, or essentially 100% of the reflective layers of an article 1 will be locally-laminated reflective layers. By a locally-laminated reflective layer is meant that a reflective layer is pre-made as an article (e.g. as part of a film-like or sheet-like structure) after which a local area of the pre-made reflective layer is physically transferred (i.e. laminated) to a portion of a carrier-borne transparent microsphere. In some embodiments a locally-laminated reflective layer will be derived from a multilayer "transfer stack" that includes one or more additional layers in addition to the reflective layer. The additional layer(s) can facilitate the transfer of the reflective layer to the transparent microsphere as discussed in detail later herein. In various embodiments, some such additional layers may remain as part of the resulting retroreflective article and some may be sacrificial layers that do not remain as part of the resulting retroreflective article. Thus in some embodiments, a locally-laminated reflective layer 30 may be a multi-layer structure that comprises a reflecting layer 301 along with additional layers such as e.g. an embrittlement layer 302 and/or a selective-bonding layer 303, as shown in exemplary embodiment in FIGS. 2 and 3. Such additional layers and their reasons for use are described in detail later herein.

Thus according to the terminology used herein, a reflective layer 30 includes a reflecting layer 301 and can include other layers (e.g. transparent layers) such as an embrittlement layer 302 and/or a selective-bonding layer 303. The term "reflecting layer" denotes the specific layer 301 (e.g. a metal layer) of a reflective layer 30 that performs the actual reflecting of light (noting again that in some embodiments layer 301 itself may comprise sublayers, e.g. in the case that layer 301 is a dielectric stack).

Figure 2:
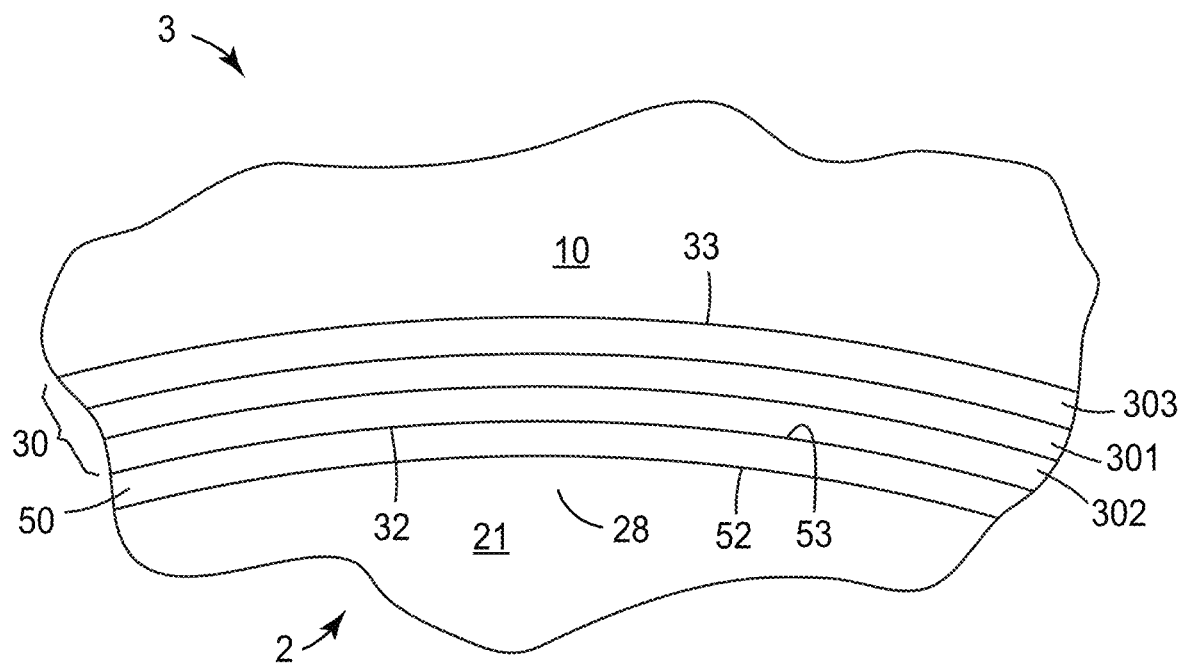
FIG. 2 is a magnified cross sectional view of a portion of FIG. 1, showing details of an exemplary reflective layer.

In embodiments of the type shown in FIG. 2, a reflective layer 30 may comprise a selective-bonding layer 303 that is rearward of reflecting layer 301 (so that a rearward major surface of selective-bonding layer 303 provides rear surface 33 of reflective layer 30); and, it may comprise an embrittlement layer 302 that is forward of reflecting layer 301 (so that a forward major surface of embrittlement layer 302 provides forward surface 32 of reflective layer 30). In embodiments of the type shown in FIG. 3, these arrangements may be reversed, with selective-bonding layer 303 being forward of reflecting layer 301 and with embrittlement layer 302 being rearward of reflecting layer 301. Any such additional layer (or layers) present in the retroreflective light pathway (e.g. layer 302 in FIG. 2, and layer 303 in FIG. 3) will be configured so as to not unduly interfere with the passage of light therethrough. For example, such a layer may be transparent.

The term "laminated" denotes an arrangement achieved by obtaining a reflective layer as a pre-made entity (e.g. a macroscopic, reflective, sheet-like or film-like item) and then physically transferring (laminating) local areas of the pre-made reflective layer to protruding areas 25 of carrier-borne microspheres 21. A laminated reflective layer is thus distinguished from a reflective layer obtained by depositing a precursor and then solidifying the precursor to form a reflective layer. It is also distinguished from a reflective layer formed by deposition of minute parcels of material onto a transparent microsphere to build up a reflective layer, such as in the vapor deposition of metals onto transparent microspheres as conventionally performed.

Figure 11:
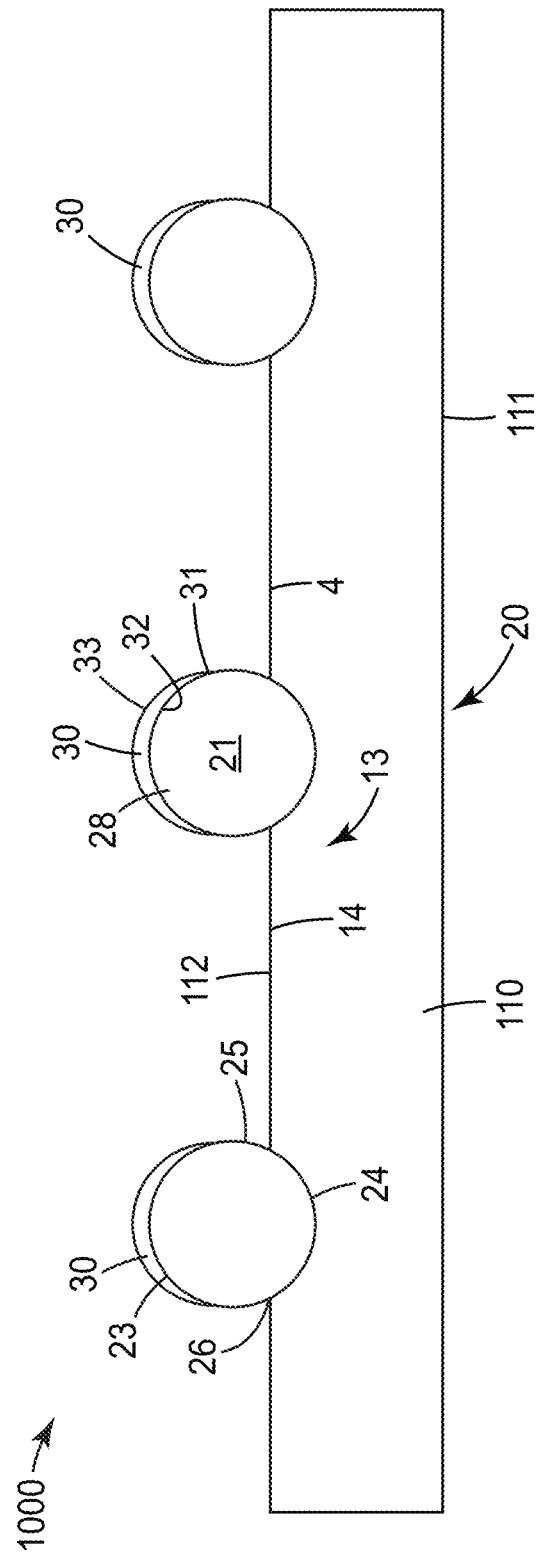
FIG. 11 is a side schematic cross sectional view of an exemplary retroreflective intermediate article, comprising a carrier layer bearing transparent microspheres with exemplary locally-laminated, isolated reflective layers disposed thereon.

To perform such a lamination, a multilayer transfer stack that comprises a reflective layer 30 can be brought into close proximity with a protruding area 25 of a transparent microsphere 21 disposed on a temporary carrier 110, so that a local area of the reflective layer contacts at least a portion of a bonding layer 50 that is present on at least a portion of the protruding area 25 of the microsphere. This local area of the reflective layer is then physically transferred to, and bonded to, this portion of the bonding layer, thus bonding this local area of the reflective layer to an area 28 of protruding area 25 of the microsphere. This will form an intermediate article of the general type depicted in FIG. 11 and discussed in detail later herein. When a binder layer is formed as described in detail later herein, protruding area 25 of the microsphere then becomes an embedded area of the microsphere, also as discussed in detail later herein.

In a local lamination process as defined herein, a local area of a pre-made reflective layer is transferred to portion of a protruding area of a transparent microsphere. During this process, the local area of the reflective layer is detached from (breaks free of) a region of the reflective layer that previously (in the pre-made reflective layer before lamination) laterally surrounded the transferred area. The laterally-surrounding region of the reflective layer from which the local area was detached is not transferred to the microsphere (or to any portion of the resulting article) but rather is removed from the vicinity of the microsphere (e.g., along with other, sacrificial layers of the multilayer transfer stack). A locally-laminated reflective layer is thus a "microscopically" laminated layer that is distinguished from a reflective layer that results from large-scale lamination to a substrate without any laminated portion of the reflective layer being detached from other regions of the reflective layer. The breaking away of locally-laminated areas of the reflective layer from their respective laterally-surrounding regions of the reflective layer is not governed by any pre-determined lines of weakness in the reflective layer. Rather, the breaking away is a result of the local deformation that the local areas of the reflective layer undergo on being forcibly conformed onto the surfaces of the microspheres.

In such a lamination process, the local area of the reflective layer that is transferred to the microsphere will release (delaminate) from other layer(s) of the multilayer transfer stack that rearwardly abutted this local area, as will be made clear by later discussions herein. This may be facilitated by a providing a release interface in the multilayer transfer stack. In many convenient embodiments such a release interface may be provided by a major surface of a release layer that is present in the transfer stack. In some embodiments the release layer may be in direct contact with a major surface of the reflective layer; in such cases the release interface will be the interface between the major surface of the reflective layer and the major surface of the release layer. However, in many embodiments at least one additional layer may be present between the reflective layer and the release layer; in such cases the release interface will be the interface between the major surface of this additional layer and the major surface of the release layer. In some embodiments this additional layer will be a selective-bonding layer that exhibits differential bonding/release on its two major surfaces. For example, one major surface of this layer may non-releasably bond to a major surface of the reflective layer, while an opposing major surface of this layer may releasably bond to a major surface of the release layer to form the release interface, as discussed in detail later herein.

Figure 3:
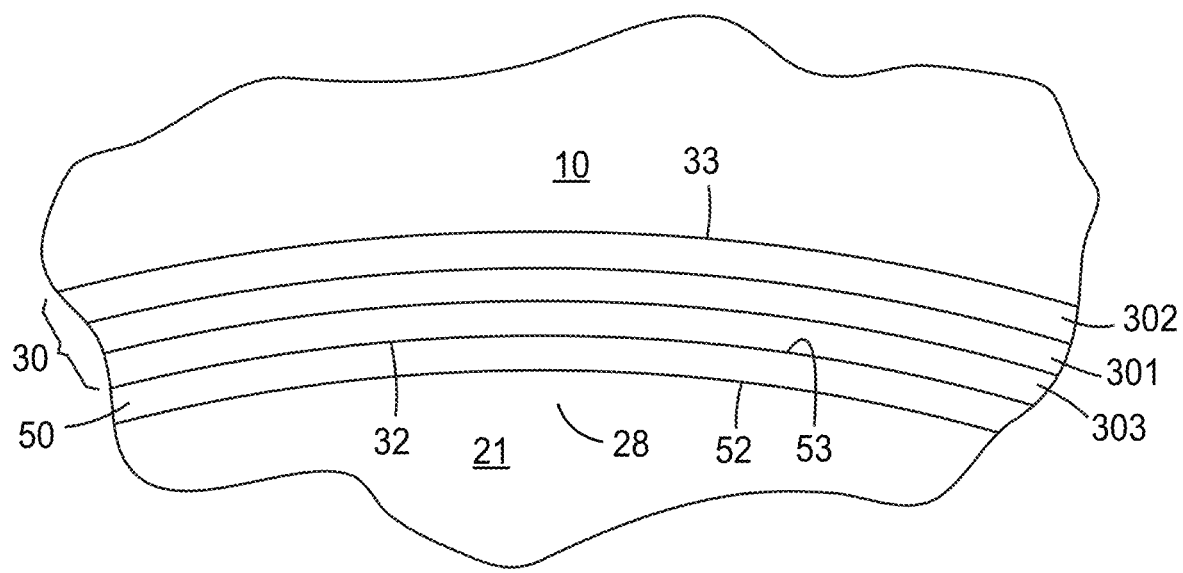
FIG. 3 is a magnified cross sectional view showing details of another exemplary reflective layer.

In some embodiments a release layer may be a sacrificial layer that does not transfer to, or remain in, the final retroreflective article and that thus may be removed and recycled, reused or disposed (thus no release layer is visible in FIG. 2 or 3). In some embodiments a selective-bonding layer 303 may remain in the final retroreflective article as in the exemplary designs of FIGS. 2 and 3. In some embodiments, a multilayer transfer stack may optionally comprise an embrittlement layer that enhances the ability of a local area of the reflective layer to break free of the region of the reflective layer that previously laterally surrounded it. In some embodiments, embrittlement layer 302 remains in the final retroreflective article, as in the exemplary designs of FIGS. 2 and 3.

U.S. Provisional Patent Application 62/478,992 describes transfer stacks (referred to as transfer articles) which may be suitable for laminating various "function" layers, and is incorporated by reference in its entirety herein. It will be appreciated that a reflective layer as described herein corresponds to a particular type of "function" layer as described in the '992 application. The '992 application also describes compositions (e.g. acrylate compositions) that are particularly suitable for use as selective-bonding layers. Locally-laminated reflective layers and the use of multilayer transfer stacks to provide such layers are discussed in detail in U.S. Provisional Patent Application No. 62/578,343 (e.g., in Example 2.3 (including Examples 2.3.1-2.3.3) and Example 2.4 (including Examples 2.4.1-2.4.5)), which is incorporated by reference in its entirety herein.

A locally-laminated reflective layer as defined and described herein will be identifiable and will be distinguishable from other types of reflective layers. Locally-laminated reflective layers will be distinguished from conventional, continuous reflective layers by virtue of the locally-laminated reflective layers being present as numerous, discontinuous, discrete entities. In some embodiments many (e.g. greater than 60, 80, 90 or 95%) such locally-laminated reflective layers may each exhibit a contiguous area, when viewed along the forward-rearward axis of the retroreflective article, of e.g. less than 0.5, 0.2, 0.1, 0.05, or 0.01 square mm. This will be distinguished from, for example, retroreflective articles comprising conventional reflective layers (e.g. vapor-coated metal layers) which may be contiguous over macroscopic areas of e.g. several square mm or more).

Beyond this, locally-laminated reflective layers may exhibit at least some features which reveal that the reflective layers were made by transfer of local areas of a pre-made reflective layer, rather than being deposited onto the microspheres e.g. in the vapor phase or as a flowable precursor. Thus, a locally-laminated reflective layer will be distinguishable e.g. from a reflective layer obtained by direct vapor-coating of a metal reflective layer or a dielectric-stack reflective layer onto a microsphere, from a reflective layer obtained by printing a reflective layer precursor (e.g. a silver ink) onto a microsphere, and so on.

Figure 12A:
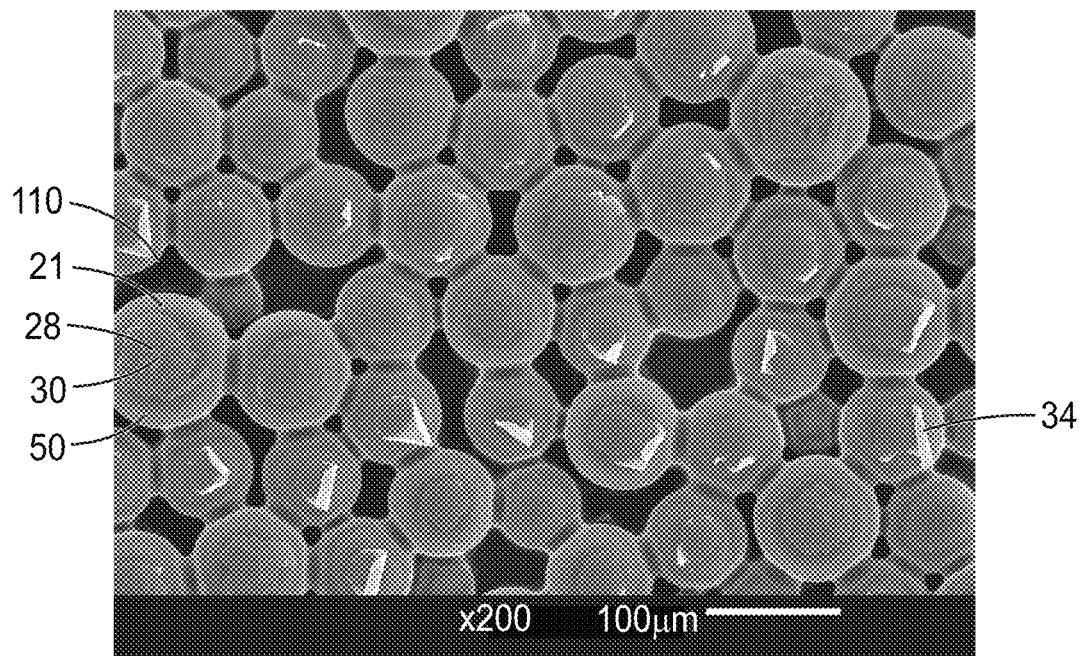
FIG. 12A is a scanning electron microscope secondary-electron 200× photograph of an exemplary Working Example article comprising a carrier layer bearing transparent microspheres with locally-transferred embedded, localized reflective layers disposed thereon.
Figure 12B:
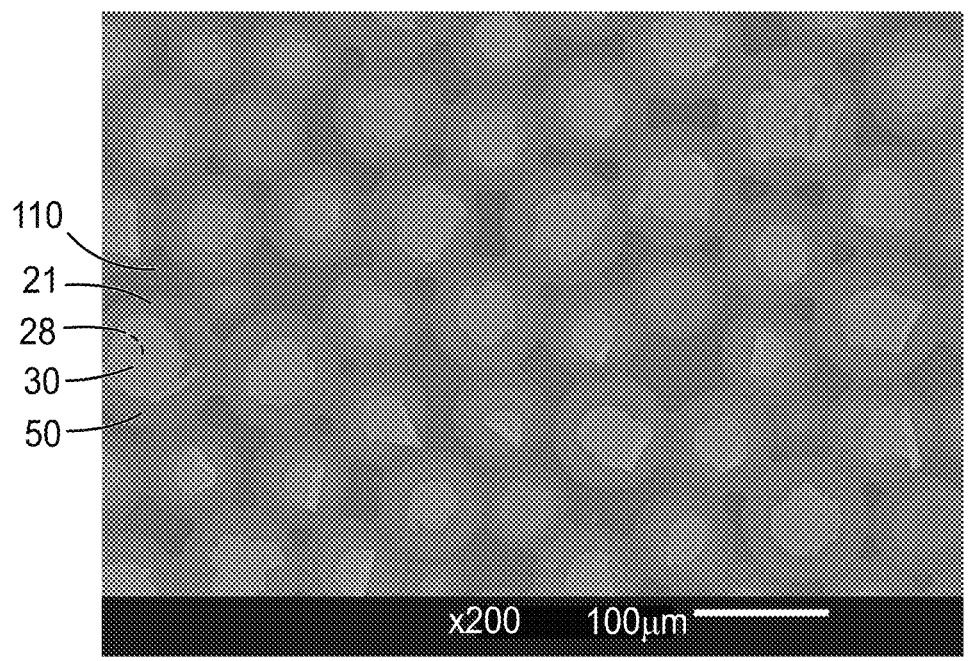
FIG. 12B is a scanning electron microscope backscattered-electron 200× photograph of the same portion of a Working Example article as FIG. 12A.
Figure 13A:
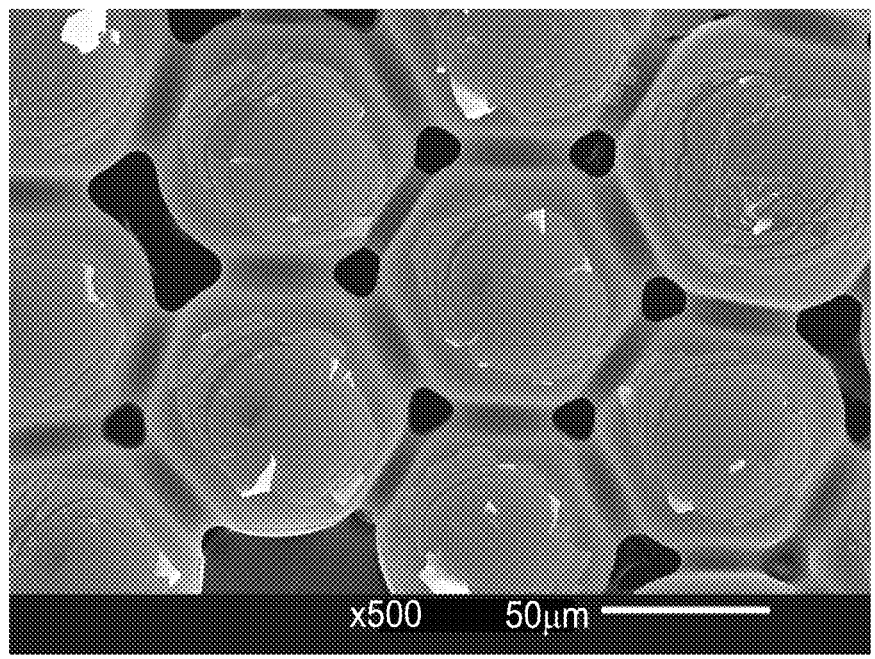
FIG. 13A is a scanning electron microscope secondary-electron 500× photograph of a portion of an exemplary Working Example article comprising a carrier layer bearing transparent microspheres with locally-transferred embedded, localized reflective layers disposed thereon.
Figure 13B:
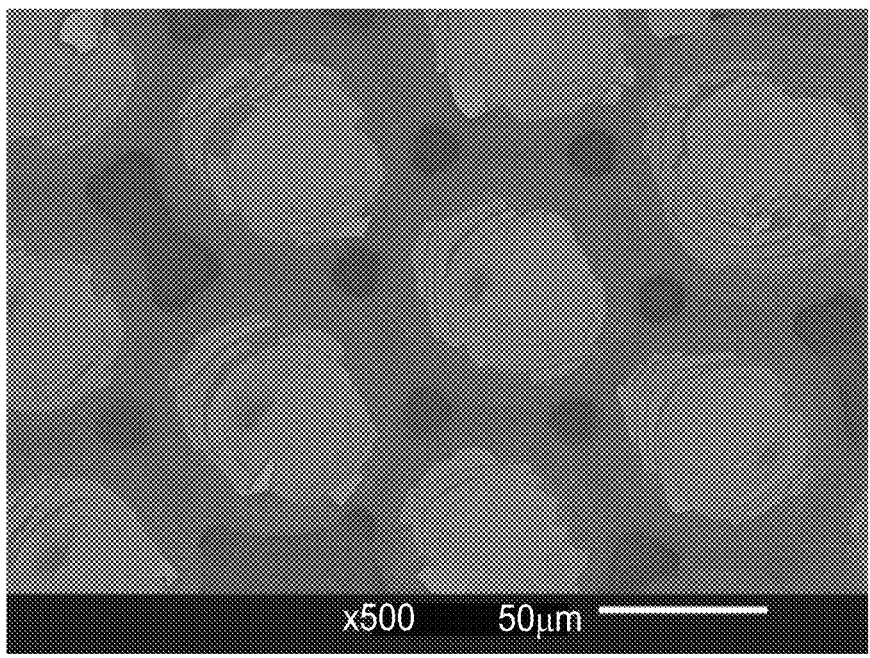
FIG. 13B is a scanning electron microscope backscattered-electron 500× photograph of the same portion of a Working Example article as FIG. 13A.

Such distinguishing characteristics might include, for example, the appearance of minor edges of a reflective layer indicating that the reflective layer was locally detached from (e.g. broken off from) a layer of reflective material that previously laterally surrounded the broken-off area. Such edges are readily observable in the Working Example photographs of FIGS. 12A, 13A and 14A. In fact, these photographs (all of which are viewed from the rear side of the transparent microspheres) reveal that in many instances locally-laminated reflective layers exhibit minor flaps or flanges (one such exemplary flap 34 is pointed out in FIG. 12A) that protrude away from the microspheres a short distance, and that sometimes appear to curl slightly rearward. Such features apparently result from the above-discussed process of detaching the locally-transferred area of the reflective layer from the regions of the reflective layer that formerly surrounded it, and can serve to further identify locally-laminated reflective layers. It is noted that the photographs of FIGS. 12A/B, 13A/B and 14A/B are all of carrier-borne beads without a binder layer having been disposed thereon; it is expected that a flowable binder precursor would flow in and around such features before solidifying, thus at least some such features would likely be expected to be present in the final retroreflective article. Some such flaps or flanges may be slightly flattened during the binder-deposition process, of course.

Other distinguishing characteristics may also be found that result from the unique nature of the local lamination of a reflective layer to a microsphere. It will be appreciated that a pre-made reflective layer will be substantially planar along at least one direction (e.g. a crossweb direction) even though it may exhibit some curvature along another direction (e.g. along a downweb axis, if the reflective layer is produced in the form of a roll good). That is, a pre-made reflective layer in a multilayer transfer stack will comprise a single axis of curvature and will thus exhibit a Gaussian curvature of zero. To perform local lamination, it is necessary for such a reflective layer to be at least generally conformed to the shape of a protruding area of a microsphere. Since the reflective layer comprises single-axis curvature and the protruding portion of the microsphere comprises multiple axes of curvature, the reflective layer cannot conform to the multiple-axis-of-curvature microsphere surface without exhibiting at least some wrinkling, crumpling, folding, fracturing, or the like. (This may be particularly true given the small radius of curvature of transparent microspheres typically used in retroreflective articles.) Such features can thus provide evidence indicating that the reflective layer is a locally-laminated reflective layer.

Figure 14A:
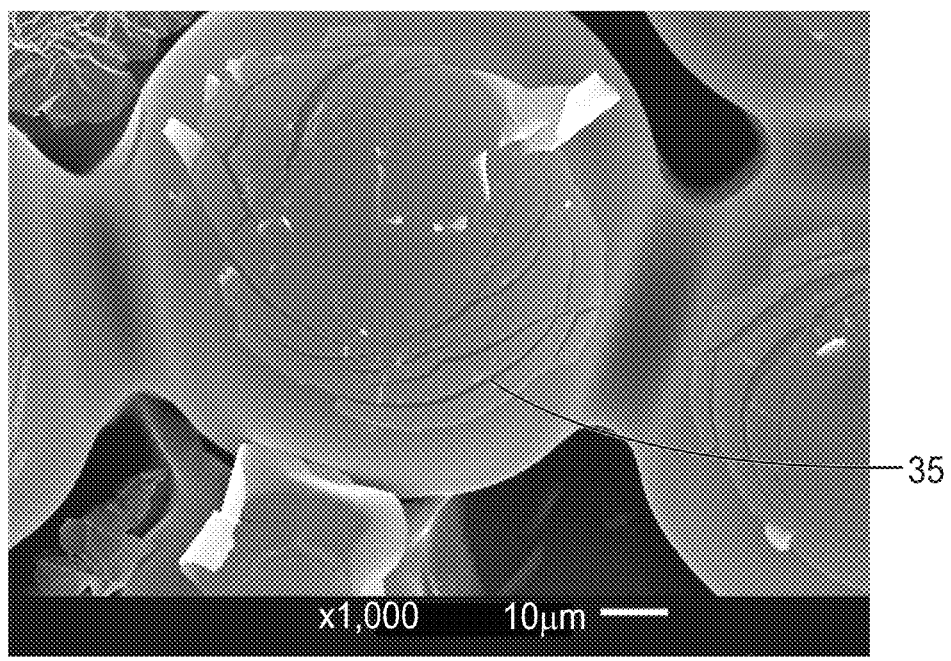
FIG. 14A is a scanning electron microscope secondary-electron 1000× photograph of a portion of an exemplary Working Example article comprising a carrier layer bearing transparent microspheres with locally-transferred embedded, localized reflective layers disposed thereon.
Figure 14B:
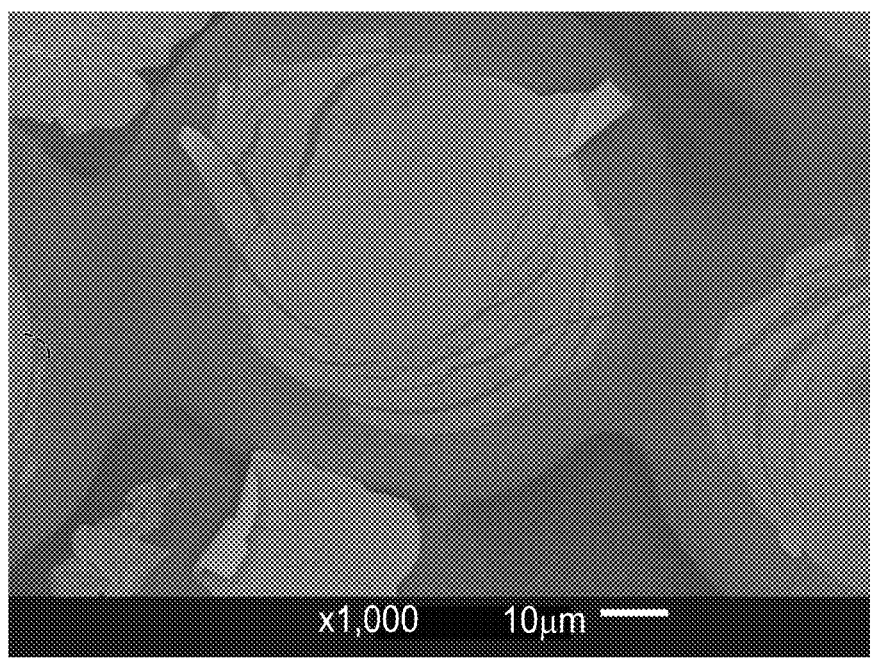
FIG. 14B is a scanning electron microscope backscattered-electron 1000× photograph of the same portion of a Working Example article as FIG. 14A.

In many embodiments locally-laminated reflective layers 30 have been found to exhibit characteristic discontinuities in the form of cracks or gaps 35, as are readily evident in the Working Example photographs of FIGS. 14A and 14B. These discontinuities appear to be the result of fracturing due to bending and/or stretching that occurred during the process of conforming the reflective layer to the protruding portion of the microsphere. Due to the unique nature of the transfer/fracturing process, at least some such features may be at least somewhat concentric with respect to the forward-rearward axis of the microsphere, as is readily evident from inspection of FIGS. 14A and 14B. Such features may thus differ from discontinuities or imperfections that may sometimes be present in a reflective layer obtained by printing/solidifying a reflective layer precursor (in which case discontinuities have typically been found to be relatively random rather than following a concentric pattern).

Thus, features such as fracture lines, cracks or gaps in the reflective layer of a transparent microsphere can provide evidence that the reflective layer is a locally-laminated reflective layer. In fact, in some embodiments a locally-laminated reflective layer may somewhat resemble (on a microscopic scale) shards of a broken mirror that are fitted to the shape of a hemispherical object. It will be still further appreciated that in some instances locally-laminated reflective layers may be identified by the presence of an embrittlement layer and/or a selective-bonding layer as described in detail elsewhere herein.

Based on the above discussions it will be appreciated that a locally-laminated reflective layer can be identified and distinguished from other reflective layers by any of several properties that may serve as an indicator that the reflective layer is a locally-laminated reflective layer. It is emphasized that locally-laminated reflective layers comprising discontinuities such as e.g. wrinkles, cracks and/or gaps, and exhibiting considerable variation and nonuniformity (as is readily evident from the various Working Example Figures), can nevertheless work well to provide acceptable retroreflectivity. It will be appreciated that this is a surprising result considering that past approaches to achieving retroreflectivity have typically involved providing reflective layers that are extremely consistent, uniform, and uninterrupted over the extent of individual microspheres, that conform to the curvature of the microspheres (or a bonding layer thereon) with exacting fidelity.

Furthermore, past approaches have typically had the goal of disposing reflective layers on at least generally all of the transparent microspheres of a retroreflective article. In contrast (as discussed in detail later herein) in some embodiments a retroreflective article comprising locally-laminated reflective layers can be purposefully configured so that a significant percentage of the transparent microspheres of the article do not comprise a locally-laminated reflective layer (or any reflective layer) disposed thereon.

Embedded Reflective Layers

As illustrated in exemplary embodiment in FIG. 1, at least some of the locally-laminated reflective layers 30 of retroreflective elements 20 of retroreflective article 1 will be embedded reflective layers. In various embodiments, at least generally, substantially, or essentially all of the reflective layers 30 of retroreflective elements 20 will be embedded reflective layers (noting that according to the terminology used herein, a transparent microsphere that lacks a reflective layer will not be considered to be a retroreflective element).

An embedded reflective layer 30 is a reflective layer that is disposed adjacent to a portion of an embedded area 25 of a transparent microsphere 21 as shown in exemplary embodiment in FIG. 1. An embedded reflective layer will at least generally conform to a portion (often including a rearmost portion) of the embedded area 25 of a transparent microsphere 21. By definition an embedded reflective layer will be completely surrounded (e.g. sandwiched) by the combination of at least the binder layer 10 and the transparent microsphere 21 (noting that in some embodiments some other layer or layers, e.g. an intervening layer such as a bonding layer and/or a color layer, may also be present in article 1, as discussed later herein, and may contribute to the surrounding of the reflective layer). In other words, the minor edges 31 of the reflective layer (as depicted in exemplary embodiment in FIG. 1) will be "buried" between the transparent microsphere 21 and the binder layer 10 (and possibly other layers) rather than being exposed. That is, the locations 26 that mark the boundary between an exposed area 24 of a microsphere and an embedded area 25 of a microsphere, will be abutted by an edge 16 of binder layer 10 (or an edge of layer disposed thereon) rather than by the minor edge 31 of reflective layer 30.

For a transparent microsphere 21 that comprises an embedded reflective layer 30, no part of embedded reflective layer 30 will be exposed so as to extend onto (i.e., cover) any portion of exposed area 24 of microsphere 21. Microspheres with embedded reflective layers 30 are thus distinguished from arrangements made by "randomized bead" processes in which microspheres are hemispherically coated with reflective layers and are then disposed randomly on a substrate so that numerous microspheres exhibit at least partially exposed reflective layers. Furthermore, retroreflective elements comprising embedded reflective layers 30 as disclosed herein will be distinguished from arrangements in which microspheres that have been coated with reflective layers over the entire surfaces of the microspheres are disposed on a substrate after which reflective layers are removed from exposed areas of the microspheres e.g. by etching. Such arrangements will not result in the reflective areas exhibiting "buried" edges and thus will not produce embedded reflective layers as defined herein.

It will be appreciated that in actual industrial production of retroreflective articles of the general type disclosed herein, small-scale statistical fluctuations may inevitably be present that may result in the formation of a very small number of e.g. minor portions of a reflective layer that exhibit a minor edge or area that is exposed rather than being buried. Such occasional occurrences are to be expected in any real-life production process; however, embedded reflective layers as disclosed herein are distinguished from circumstances in which reflective layers are purposefully arranged in a manner in which they will exhibit a large number of exposed minor edges or areas.

Localized/Bridging Reflective Layers

In some embodiments an embedded reflective layer 30 will be a localized reflective layer as shown in exemplary embodiment in FIG. 1. By definition, a localized reflective layer is an embedded reflective layer that does not comprise any portion that extends away from an embedded area 25 of a microsphere 21 along any lateral dimension of article 1 to an extent sufficient to bridge a lateral gap between neighboring transparent microspheres 21. (Minor flaps or flanges of the general type discussed above and pointed out e.g. in FIG. 12A do not extend far enough laterally for reflective layers comprising such features to qualify as bridging reflective layers.) In some embodiments, at least generally, substantially, or essentially all (according to the previously-provided definitions) of the embedded reflective layers 30 of a retroreflective article will be localized reflective layers.

However, in some embodiments a locally-laminated reflective layer can be a "bridging" reflective layer that can bridge multiple (at least two) transparent microspheres. A reflective layer that bridges microspheres is a reflective layer having a first section that is positioned generally rearward of at least a portion of a first microsphere and a second section that is positioned generally rearward of at least a portion of a second microsphere. A single reflective layer may thus operate in conjunction with two (or more) transparent microspheres and will be termed a "bridging" reflective layer. Some bridging microspheres may comprise other sections that are positioned generally rearward of other microspheres. In various embodiments, bridging reflective layers may bridge two, three, four, or as many as ten microspheres.

Figure 15:
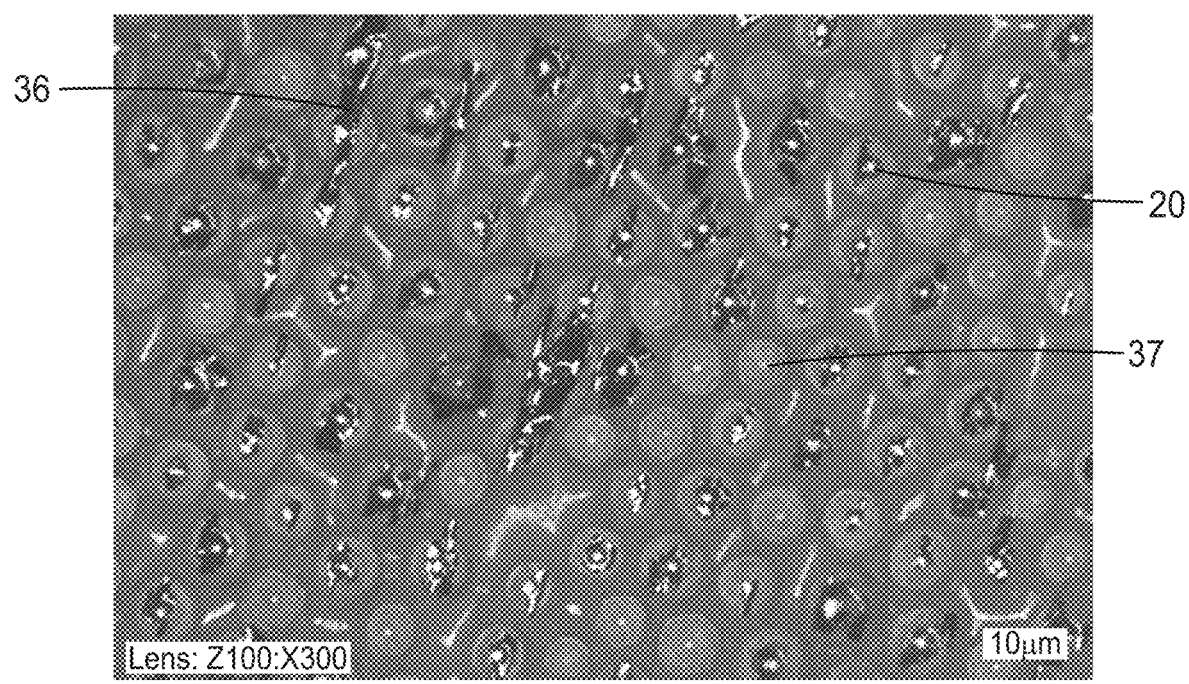
FIG. 15 is an optical microscope 300× photograph of a portion of an exemplary Working Example article comprising a carrier layer bearing transparent microspheres with locally-transferred, embedded reflective layers, including at least one bridging reflective layer, disposed thereon.

Bridging reflective layers are not localized reflective layers as defined herein, however, the perimeter edges of bridging reflective layers are buried between the transparent microspheres and the binder material; bridging reflective layers are thus "embedded" reflective layers. An exemplary locally-laminated, embedded, bridging reflective layer (which is dark-colored in appearance in this optical photograph) is identified by reference number 36 in the photograph of a Working Example sample present in FIG. 15; this bridging reflective layer appears to bridge three transparent microspheres (a locally-laminated, non-bridging (i.e. localized) reflective layer 30 is also indicated in FIG. 15 for reference).

It will be appreciated that the presence of bridging reflective layers may be statistically-occurring and that, in many embodiments, the majority of the locally-laminated reflective layers will be localized reflective layers, with each such reflective layer serving a single transparent microsphere. In various embodiments, bridging reflective layers may represent less than 40, 30, 20, 10, 5, 2 or 1% (by number) of the total number of locally-laminated reflective layers that are present in the retroreflective article. In further embodiments, bridging reflective layers may represent at least 0.1, 0.5, 1.5, 3.0, 8, 16, 24, or 36% of the total number of locally-laminated reflective layers that are present. However, in some embodiments (e.g. depending on lamination conditions as discussed in detail later herein) bridging reflective layers may represent a large proportion of the total number of locally laminated reflective layers present. Thus in such embodiments, bridging reflective layers may represent at least 50, 60, 70, 80, 90, or 95% of the total number of locally-laminated reflective layers that are present. In further embodiments, bridging reflective layers may represent at most 100, 85, 75, 65 or 55% of the total number of locally-laminated reflective layers that are present.

Figure 4:
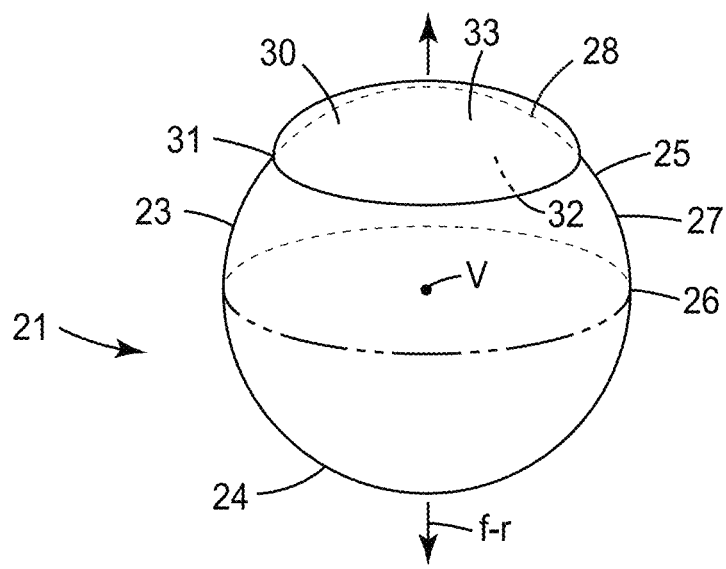
FIG. 4 is an isolated magnified perspective view of a single transparent microsphere and an exemplary locally-transferred, embedded, localized reflective layer.
Figure 5:
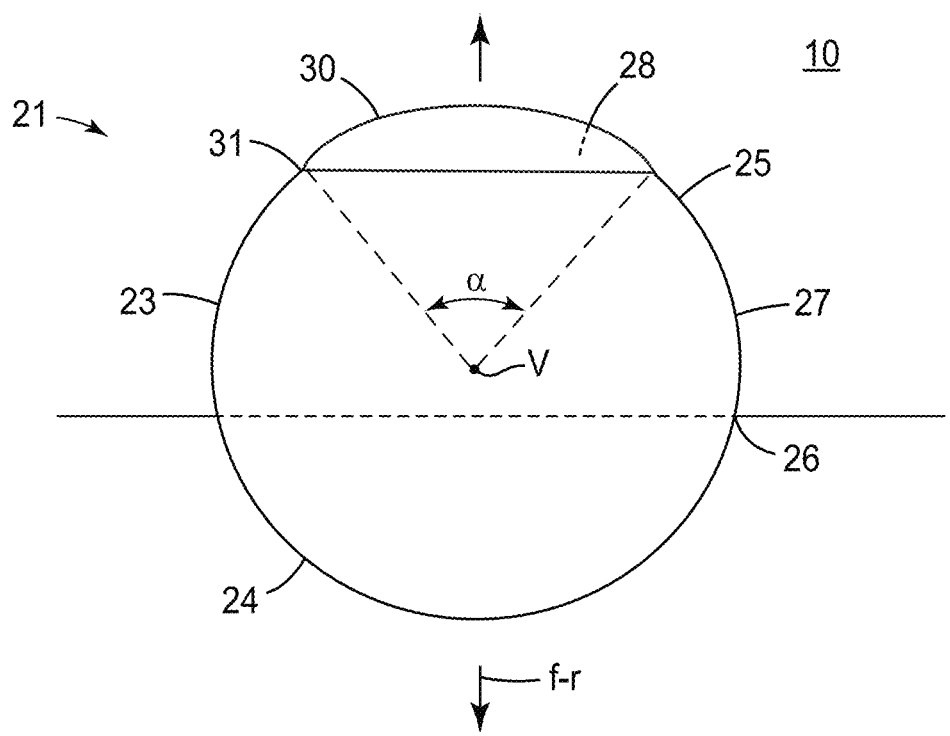
FIG. 5 is an isolated magnified side schematic cross sectional view of a single transparent microsphere and an exemplary locally-transferred embedded, localized reflective layer.

FIG. 4 is a magnified isolated perspective view of a transparent microsphere 21 and an exemplary locally-laminated embedded reflective layer 30, with a binder layer 10 omitted for ease of visualizing reflective layer 30. FIG. 5 is a magnified isolated side schematic cross sectional view of a transparent microsphere and an embedded reflective layer 30. (In FIGS. 4 and 5, the embedded reflective layer is also a localized reflective layer.) As shown in these Figures, a reflective layer 30 will comprise a major forward surface 32 that often exhibits a generally arcuate shape, e.g. in which at least a portion of forward surface 32 at least generally conforms to a portion of a major rearward surface 23 of microsphere 21. In some embodiments, major forward surface 32 of reflective layer 30 may be in direct contact with major rearward surface 23 of microsphere 21; however, in some embodiments major forward surface 32 of reflective layer 30 may be in contact with a layer that is itself disposed on major rearward surface 23 of microsphere 21, as discussed in further detail elsewhere herein. A layer that is disposed in this manner may be, e.g., a transparent layer that serves e.g. as a protective layer, as a tie layer or adhesion-promoting layer; or, such a layer may be a color layer as discussed in detail later herein. A major rearward surface 33 of reflective layer 30 (e.g. a surface that is in contact with forward-facing surface 12 of binder layer 10 as shown in FIG. 1, or a surface of a layer present thereon) may be, but does not necessarily have to be, at least generally congruent with (e.g. locally parallel to) the major forward surface 32 of reflective layer 30. This may depend e.g. on the particular manner in which the reflective layer is disposed on the transparent microspheres, as discussed later herein.

Percent Area Coverage of Reflective Layers

As evident from FIGS. 4 and 5, an embedded reflective layer 30 may be disposed so that it occupies (covers) a portion 28, but not the entirety, of embedded area 25 of microsphere 21. The remainder of embedded area 25 will be area 27 that is not occupied by reflective layer 30. Such arrangements can be characterized in terms of the percentage of embedded area 25 that is covered by reflective layer 30 (regardless of whether layer 30 is in direct contact with area 25 or is separated therefrom by e.g. a tie layer or the like). In various embodiments, a reflective layer, if present on a microsphere, may occupy a covered portion 28 that is at least 5, 10, 20, 30, 40, 50, 60, or 70 percent of embedded area 25 of the microsphere. In further embodiments, a reflective layer, if present, may occupy a covered portion 28 that is at most 95, 85, 75, 60, 55, 45, 35, 25, or 15 percent of embedded area 25. Such calculations will be based on the actual percentage of multidimensionally-curved embedded area 25 that is covered by reflective layer 30, rather than using e.g. plane-projected areas. By way of a specific example, the exemplary reflective layer 30 of FIG. 5 occupies a portion 28 that is estimated to be approximately 20-25% of embedded area 25 of microsphere 21.

In some embodiments a reflective layer 30 may be characterized in terms of the percentage of the total surface area of the microsphere (i.e., embedded area 25 plus exposed area 24) that is occupied (covered) by the reflective layer. In various embodiments, a reflective layer, if present on a microsphere, may occupy a covered area that is at least 5, 10, 15, 20, 25, 30 or 35 percent of the total surface area of the microsphere. In further embodiments, a reflective layer, if present, may occupy a covered area that is less than 50, 45, 40, 35, 30, 25, 20, 15, or 10 percent of the total surface area of the microsphere. By way of a specific example, the exemplary reflective layer 30 of FIG. 5 is estimated to occupy an area 28 that is approximately 10-12% of the total surface area of microsphere 21.

In some embodiments, an embedded reflective layer 30 may be characterized in terms of an angular arc that the reflective layer occupies. For purposes of measurement, such an angular arc α may be taken along a cross-sectional slice of the transparent microsphere (e.g. resulting in a cross-sectional view such as in FIG. 5) and may be measured from a vertex (v) at the geometric center of transparent microsphere 21, as shown in FIG. 5. In various embodiments, an embedded reflective layer 30 may be disposed so that it occupies an angular arc α comprising less than 180, 140, 100, 80, 60, 40 or 30 degrees. In further embodiments, a reflective layer may occupy an angular arc α of at least about 5, 10, 15, 25, 35, 45, 55, 75, 95, or 135 degrees. (By way of specific examples, the exemplary reflective layers 30 of FIG. 1 and the exemplary reflective layers 30 of FIG. 5 are estimated to occupy an angular arc α in the range of approximately 80-85 degrees.)

Figure 6:
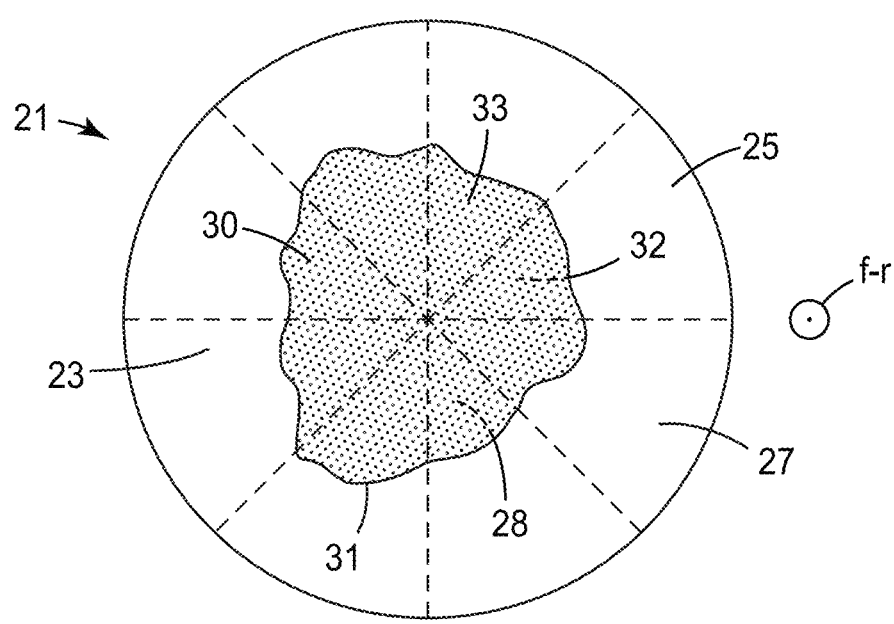
FIG. 6 is an isolated magnified top plan view of a single transparent microsphere and an exemplary locally-transferred embedded, localized reflective layer.

In some embodiments an embedded reflective layer 30 may not necessarily be symmetrical (e.g., circular and/or centered on the front-rear centerline of the transparent microsphere) when viewed along the front-rear axis of the transparent microsphere. Rather, in some cases a reflective layer 30 may be non-circular, e.g. oval, irregular, lop-sided, splotchy, etc., in the general manner shown in the generic representation of FIG. 6. Accordingly, if such a reflective layer is to be characterized by an angular arc in the manner described above, an average value of the angular arc will be reported. Such an average value can be obtained, for example, by measuring the angular arc at several (e.g. four) locations spaced around the microsphere (with the microsphere viewed along its front-rear axis) as indicated in FIG. 6 and taking the average of these measurements. (Such methods may also be used to obtain the above-described area percentages.)

For a reflective layer that is symmetrically positioned on a microsphere e.g. as in FIGS. 4-5, the midpoint of any or all such angular arcs may at least substantially coincide with the front-rear axis (centerline) of the microsphere. That is, for a reflective layer that is both symmetrically positioned and is symmetrical shaped, the geometric center of the reflective layer may coincide with the front-rear centerline of the microsphere. However, in some embodiments a reflective layer may be at least slightly offset relative to the front-rear centerline of the microsphere, so that at least some such midpoints may be located e.g. 10, 20, 30, 45, or even 60 degrees away from the front-rear centerline of the microsphere.

In additional to any individual reflective layer possibly exhibiting an irregular shape as in FIG. 6, the reflective layers of different microspheres may differ from each other in shape and/or size. For example, in some embodiments reflective layers may be disposed on microspheres by being transferred to protruding portions thereof, while the microspheres are partially (and temporarily) embedded in a carrier. Since different microspheres may vary slightly in diameter, and/or there may be variations in the depth to which different microspheres are embedded in the carrier, different microspheres may protrude different distances outward from the carrier. In some cases microspheres that protrude further outward from the carrier may receive a greater amount of reflective layer transferred thereto, in comparison to microspheres that are more deeply embedded in the carrier. This being the case, it will be understood that the reflective layers of various microspheres may differ from each other in terms of the angular arc occupied by the reflective layer and/or in terms of the percentage of the embedded area of microsphere (or the percentage of the total area of the microsphere) occupied by the reflective layer.

Such variations notwithstanding, it will be understood that retroreflective elements comprising locally-laminated, embedded reflective layers as disclosed herein are distinguished from arrangements in which transparent microspheres that are hemispherically covered with reflective layers are disposed randomly (e.g. by so-called "randomized-bead" processes) onto binder layers. That is, embedded reflective layers as disclosed herein will tend to be clustered on or near the rearmost portion of the microspheres; or, if the reflective layers are offset from this rearmost portion, they will tend to be offset in the same direction. In contrast, randomized-bead approaches will result in reflective layers that are distributed widely throughout all possible angular orientations on the surfaces of the microspheres.

A locally-laminated, embedded reflective layer may exhibit any suitable thickness (e.g. average thickness, measured at several locations over the extent of the reflective layer). It will be appreciated that different methods of making a reflective layer may give rise to reflective layers of differing thickness. In various embodiments, an embedded reflective layer may exhibit an average thickness (e.g. measured at several locations over the extent of the reflective layer) of from at least 0.01, 0.05, 0.1, 0.2, 0.5, 1, 2, 4, or 8 microns, to at most 40, 20, 10, 7, 5, 4, 3, 2 or 1 microns. In various other embodiments, an embedded reflective layer may comprise an average thickness of at least 10, 20, 40 or 80 nanometers; in further embodiments such a reflective layer may comprise an average thickness of at most 10, 5, 2 or 1 microns, or of at most 400, 200 or 100 nanometers. If the reflective layer (or set of sublayers, e.g. of a dielectric stack that collectively provides a reflective layer) is a layer of a multilayer stack (e.g. a transfer stack as described later herein), these thicknesses apply only to the reflective layer itself.

The arrangements disclosed herein can provide a transparent microsphere with a locally-laminated reflective layer 30 that occupies a portion 28 of embedded area 25 that is smaller, sometimes far smaller, than the total embedded area 25 of the transparent microsphere 21. In at least some embodiments, this can provide significant advantages. For example, this can provide that acceptable retroreflective performance is achieved (e.g. at least with light that impinges on the microspheres generally along the front-rear axis of the article), while also providing that the presence of the reflective layers does not significantly detract from the appearance of the article in ambient light. That is, in ambient light the article may exhibit an appearance that is largely imparted by the composition of the binder, in particular by any colorants or patterns that may be present in the binder, rather than being dominated by the presence of reflective layers.

In further detail, for a retroreflective article in which the entirety of the embedded areas of all of the microspheres of the article are covered with reflective layers, the reflective layers can dominate the appearance of the article in ambient light (e.g. so that the article exhibits a grey or washed-out appearance). In contrast, the present arrangements can provide that, in some embodiments, the "native" color of the article, e.g. as imparted by one or more colorants disposed in the binder layer, can be perceived in ambient light. In other words, enhanced color fidelity or vividness in ambient light can be provided. In some embodiments, a macroscopic pattern perceivable in ambient light can be created behind the reflective layers in the present arrangements, such as by the presence (or the absence) of one or more colorants in the binder layer.

It will thus be appreciated that the arrangements disclosed herein allow designers of retroreflective articles to operate in a design space in which the retroreflective performance, and the color/appearance in ambient light, of the article can both be manipulated. While there may be some tradeoff (e.g. the retroreflectivity may rise as the color fidelity falls, and vice versa), the design space is such that acceptable values of both parameters can be obtained, and can be tailored for particular applications.

Nonuniform Reflective Layers

Still further, the present arrangements tolerate, and even make use of, significant variability in the locally-laminated reflective layers. That is, it will be appreciated from the discussions herein that locally-laminated reflective layers can exhibit in significant variability in the percent area coverage exhibited by the reflective layers (i.e., in the size of reflective-layer-covered area 28 in relation to embedded area 25) over the population of microspheres. This is evidenced by the variability in the sizes of areas 28 that are covered by reflective layers 30, in the scanning electron micrographs (at various magnifications) of various Working Example samples that are presented in FIGS. 12A/12B, 13A/13B, and 14A/14B. The "A" Figures are obtained via secondary electron imaging, which provides more visual detail. The "B" Figures are the same images but obtained via backscattered electron imaging, in which high atomic number elements stands out as being very light (white) colored. Details of respective image contrast mechanisms can be found, for example, in Chapter 2 of Scanning Electron Microscopy and X-ray Microanalysis, $4^{th}$ Edition by J I Goldstein, D E Newbury, J R Michael, N W M Ritchie, J H J Scott, and D C Joy, Springer 2018. (In the particular Working Example samples presented in these Figures the reflective layer was metallic silver which, in the "B" Figures, appeared very white in contrast to the darker colors of the glass microspheres and the various organic polymer layers.) The optical photograph of FIG. 15 similarly shows considerable variability in the sizes of the reflective layers.

All of these Figures are of carrier-borne microspheres 21 with an intervening layer 50 (described later herein) and a reflective layer 30 disposed thereon but without a binder layer 10 having yet been formed thereon. However, these Figures are considered to be representative of how the microspheres and reflective layers would be arranged, after a binder layer had been formed thereon. The occasional dark-colored cavities visible in FIGS. 12A/12B, 13A/13B, and 14A/14B result from through-holes in the intervening layer 50 where the layer precursor did not fully wet into gaps between the microspheres 21, thus the surface of the carrier layer 110 is visible (and is dark-colored) through the resulting holes in the intervening layer.

As noted above, FIGS. 12A/12B, 13A/13B, and 14A/14B (as well as FIG. 15) reveal considerable variation in the area coverage exhibited by the different reflective layers. Still further, as is evident from the higher-magnification micrographs of FIGS. 13A/13B and 14A/14B, in many instances transferred reflective layers exhibit numerous interruptions (e.g. cracks and gaps) within the nominal overall area covered by the reflective layer. The previously-discussed percent area coverage may be calculated in disregard of such gaps if they are relatively insignificant (e.g., if they will not change the calculated area coverage by more than 10%). However, if such gaps would significantly affect the calculated area coverage, they should be taken into account. The previously-discussed angular arc, however, may be calculated using the nominal outer perimeter of the reflective layer, disregarding any such gaps.

It will thus be appreciated that for a population of retroreflective elements, the percent area coverages (and resulting overall sizes) exhibited by the different locally-laminated reflective layers, and the amount and/or size of gaps within the different reflective layers, may vary considerably. (Based on the above discussions it will be appreciated that the non-photographic Figures of the present application are idealized representations in which, for ease of presentation, the above-discussed variations are not depicted.) Surprisingly, acceptable or even excellent retroreflective performance can be obtained in spite of such nonuniformity of the locally-laminated reflective layers. In various embodiments, the percent area coverage of embedded areas of transparent microspheres by reflective layers, when evaluated over a statistically appropriate sample of microspheres of the total microsphere population, may exhibit a coefficient of variation (obtained by standard statistical techniques, and expressed as a decimal proportion) that is greater than zero. By way of a specific example, a set of microspheres whose reflective layers exhibited a mean percent area coverage of 44 percent and a standard deviation of 26 percent (in the same units as the mean), would exhibit a coefficient of variation of 0.59.

Locally-laminated reflective layers with percent area coverages (of the embedded areas of the microspheres) that exhibit a coefficient of variation of greater than 0.05 will be referred to herein as "nonuniform" reflective layers. In various embodiments, nonuniform reflective layers may be configured so that the percent area coverage of embedded areas of transparent microspheres by the reflective layers exhibits a coefficient of variation of greater than 0.10, 0.15, 0.20, 0.30, 0.40, 0.50, 0.60, 0.80, 1.0, 1.2, 1.4, or 2.0. In similar manner, a coefficient of variation of the percent area coverage of the total surface area of the transparent microspheres by the reflective layers may be calculated. In various embodiments, such a coefficient of variation may be greater than 0.05, 0.10, 0.15, 0.20, 0.30, 0.40, 0.50, 0.60, 0.80, 1.0, 1.2, 1.4, or 2.0. In similar manner, a coefficient of variation of the previously-described angular arcs occupied by the reflective layers may be calculated. In various embodiments, such a coefficient of variation may be greater than 0.05, 0.10, 0.15, 0.20, 0.30, 0.40, 0.50, 0.60, 0.80, 1.0, 1.2, 1.4, or 2.0.

It will be appreciated that a population of locally-laminated, nonuniform reflective layers as defined and described herein differs markedly from conventional, uniform populations of reflective layers as often described in the art. Conventional approaches (whether using transparent microspheres, prismatic elements such as cube-corners, etc.) typically seek to achieve as much uniformity in geometric parameters as possible. Ordinary artisans will appreciate that conventional procedures in which transparent microspheres are partially embedded in a temporary carrier, the protruding portions of the microspheres are provided with reflective layers by deposition methods that are at least generally uniform over a large scale, and a binder layer is then formed thereon, will not produce nonuniform reflective layers as defined and described herein. Examples of at least generally uniform deposition methods (i.e., methods that "blanket" a large number of protruding portions of microspheres with reflective coatings in generally uniform fashion) that would not be expected by an ordinary artisan to provide nonuniform reflective coatings include e.g. vacuum deposition, vapor coating, sputter coating, electroless plating, and the like (when performed without any masking, subsequent etching, or any such action that might impose variation). Specific examples of reflective layers that exhibit such high uniformity as to seemingly exhibit a zero coefficient of variation and that thus would not qualify as nonuniform reflective layers as defined herein, include e.g. the reflective layers pictured in U.S. Pat. Nos. 3,700,305, 4,763,985, and 5,344,705.

It is thus evident that the approaches disclosed herein differ sharply from conventional approaches to producing retroreflective articles. The present arrangements tolerate, and even welcome, considerable variation in the shape, size, etc. of the various reflective layers, as long as acceptable overall performance (in particular, a balance between retroreflectivity in retroreflected light and color fidelity/vividness in ambient light) is achieved. Furthermore, rather than requiring reflective layers to be continuous and defect-free (i.e. free of through-holes), in at least some embodiments at least some of the reflective layers may comprise interruptions (e.g. holes, cracks or gaps) so that they are optically "leaky".

Absence of Locally-Laminated Reflective Layers

Still further, in some embodiments a significant number of transparent microspheres may completely lack a locally-laminated reflective layer. (Microspheres without such reflective layers will not be included in the above-mentioned statistical analysis to obtain a coefficient of variation for the percent area coverage of the reflective layer population.) That is, in some embodiments local lamination methods may leave a large number of microspheres without a reflective layer disposed thereon. Numerous transparent microspheres that lack any reflective layer are visible in the photograph of a Working Example sample presented in FIG. 15; one such microsphere is identified by the reference number 37 (the small white dots that are visible in the center of many such microspheres are optical artifacts of the microspheres themselves). For comparison, a randomly picked reflective-layer-bearing microsphere is identified by reference number 20. The presence of transparent microspheres that lack reflective layers disposed thereon has been found to be acceptable (e.g., a sufficiently high coefficient of retroreflectivity can still be attained) in many circumstances.

Figure 16:
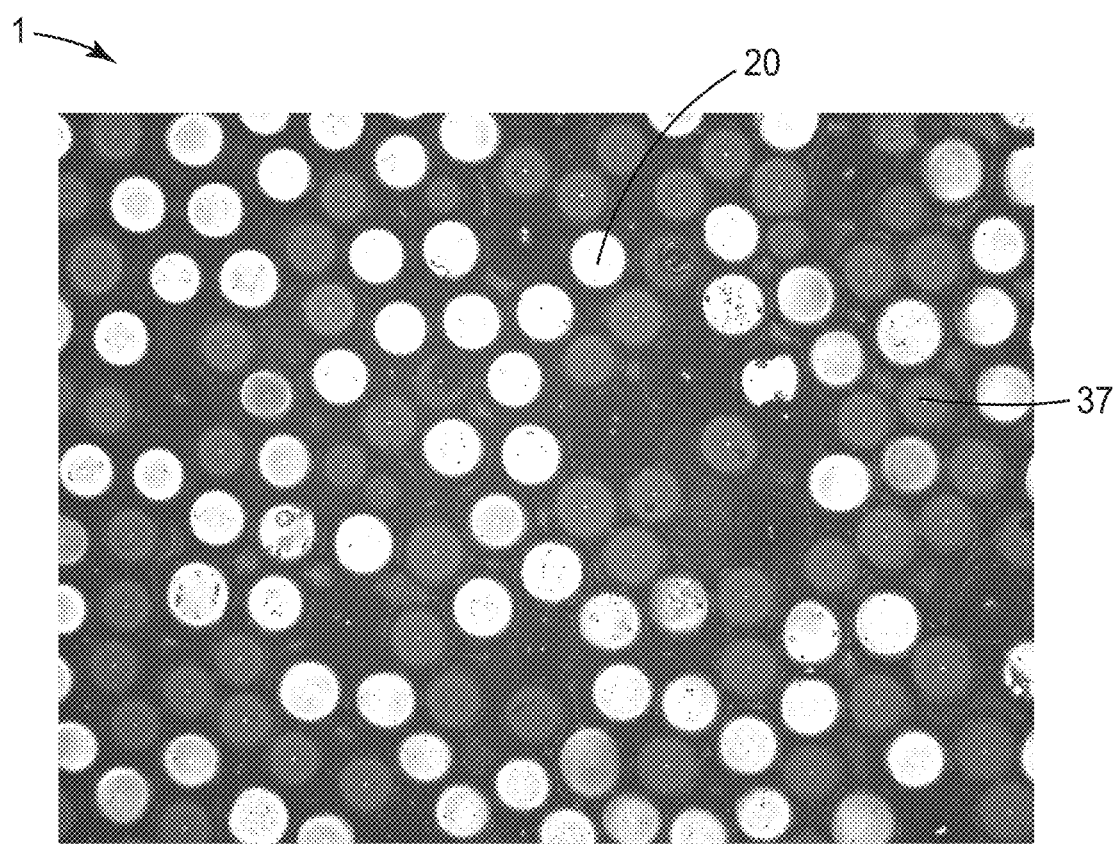
FIG. 16 is a front-lit optical microscope photograph of a portion of an exemplary Working Example retroreflective article.

FIG. 16 is a front-lit optical microphotograph (taken at a magnification similar to that of FIG. 15), of the front (viewing) side of a retroreflective article (including a binder layer) of a generally similar type to that shown in FIG. 15. While the FIG. 16 photograph is not quantitative, it reveals that under conditions of front-lit microscope interrogation (which mimics a retroreflective viewing condition with the light source fairly close to the detector), microspheres bearing reflective layers disposed thereon exhibit pronounced retroreflectivity and are clearly distinguishable from microspheres 37 without reflective layers disposed thereon. Furthermore, the reflective-layer-bearing microspheres 20 of FIG. 16 appear to display good uniformity of retroreflection even though they comprise reflective layers that vary widely in size and shape (i.e., that are of the general type of FIG. 15).

Thus in various embodiments, a retroreflective article may be configured so that the transparent microspheres that comprise locally-laminated reflective layers represent less than 95, 90, 80, 60, 40, 20, or even 15 percent (by number) of the total transparent microspheres present in the retroreflective article. In other embodiments, transparent microspheres that comprise locally-laminated reflective layers will be more than 5, 10, 20, 30, 50, 70, or 80 percent of the total transparent microspheres present in the retroreflective article. In many embodiments the transparent microspheres that lack locally-laminated reflective layers will not comprise any reflective layer disposed thereon (the presence of a "secondary" reflective layer achieved by including reflective particles in binder layer 10, as discussed later herein, is excluded from the definition of a reflective layer that is "disposed on" a microsphere).

In some embodiments, a locally-laminated reflective layer 30 may comprise a metal layer, e.g. a single layer, or multiple layers, of vapor-deposited metal (e.g. aluminum or silver). In some embodiments, a locally-laminated reflective layer may comprise a dielectric reflective layer, comprised of an optical stack of high and low refractive index layers that combine to provide reflective properties. Dielectric reflective layers are described in further detail in U.S. Patent Application Publication No. 2017/0131444, which is incorporated by reference in its entirety herein for this purpose. In particular embodiments, a dielectric reflective layer may be a so-called layer-by-layer (LBL) structure in which each layer of the optical stack (i.e., each high-index layer and each low-index layer) is itself comprised of a substack of multiple bilayers. Each bilayer is in turn comprised of a first sub-layer (e.g. a positively charged sub-layer) and a second sub-layer (e.g. a negatively charged sub-layer). At least one sub-layer of the bilayers of the high-index substack will comprise ingredients that impart a high refractive index, while at least one sub-layer of the bilayers of the low-index substack will comprise ingredients that impart a low refractive index. LBL structures, methods of making such structures, and retroreflective articles comprising dielectric reflective layers comprising such structures, are described in detail in U.S. Patent Application Publication No. 2017/0276844, which is incorporated by reference in its entirety herein. In some embodiments a reflective layer thus may comprise multiple sublayers. In some embodiments a hybrid configuration may be used in which metal reflective layers and dielectric reflective layers may both be present, e.g. as discussed in U.S. Patent Application Publication 2017/0192142. In some embodiments a layer of a transfer stack (e.g. a selective-bonding layer 303 or an embrittlement layer 302 as described elsewhere herein) may serve as a layer of a dielectric stack.

As shown in exemplary embodiment in FIG. 1, in some embodiments an intervening layer 50 (e.g. a transparent layer of organic polymeric material) may be provided so that a portion, or the entirety, of the intervening layer is rearward of a microsphere 21 and forward of at least a portion of an embedded reflective layer 30. At least a portion of such an intervening layer 50 may thus be sandwiched between microsphere 21 and reflective layer 30, e.g. with a forward surface 52 of intervening layer 50 being in contact with a rearward surface of embedded area 25 of microsphere 21, and with a rearward surface 53 of intervening layer 50 being in contact with forward surface 32 of embedded reflective layer 30. In some embodiments such a layer 50 may be continuous so as to have portions that reside on front surface 4 of article 1 in addition to being present rearward of microspheres 21, as in the exemplary arrangement of FIG. 1. In other embodiments such a layer may be discontinuous (e.g., it may be a localized, embedded layer) and may only be present rearward of microspheres 21 e.g. in a similar manner to later-described color layers 40 of FIG. 7. Furthermore, even a "continuous" layer 50 may exhibit occasional through-holes or cavities in places where the layer precursor did not fully wet into gaps between the microspheres 21, as noted earlier.

Such an intervening layer may serve any desired function. In some embodiments it may serve as a physically-protective layer and/or a chemically-protective layer (e.g. that provides enhanced abrasion resistance, resistance to corrosion, etc.). In some embodiments such a layer may serve as a bonding layer (e.g. a tie layer or adhesion-promoting layer) that is capable of being bonded to by a reflective layer as discussed later herein. It will be appreciated that some intervening layers may serve more than one, e.g. all, of these purposes. In some embodiments, such an intervening layer may be transparent (specifically, it may be at least essentially free of any colorant or the like). Organic polymeric layers (e.g. protective layers) and potentially suitable compositions thereof are described in detail in U.S. Patent Application Publication No. 2017/0276844, which is incorporated by reference in its entirety herein. In particular embodiments, such a layer may be comprised of a polyurethane material. Various polyurethane materials that may be suitable for such purposes are described e.g. in U.S. Patent Application Publication No. 2017/0131444, which is incorporated by reference in its entirety herein.

Figure 7:
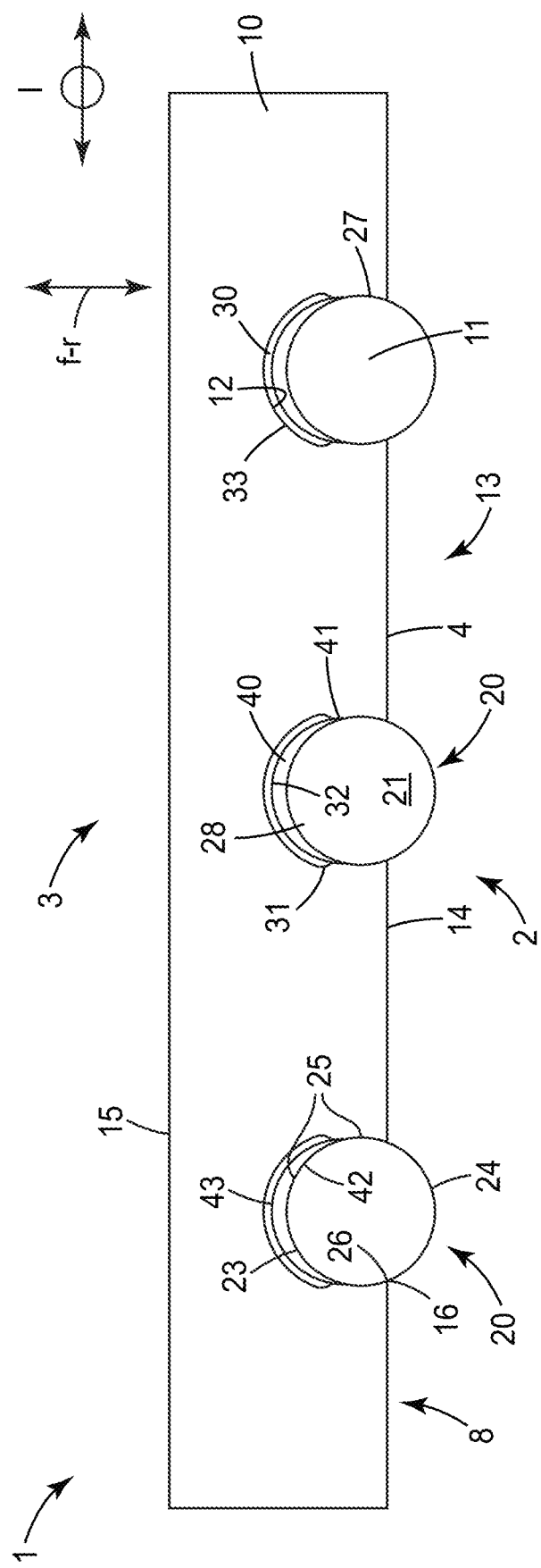
FIG. 7 is a side schematic cross sectional view of another exemplary retroreflective article, comprising an embedded, localized color layer.

As illustrated in exemplary embodiment in FIG. 7, in some embodiments at least some of the retroreflective elements 20 may comprise at least one color layer 40. The term "color layer" is used herein to signify a layer that preferentially allows passage of electromagnetic radiation in at least one wavelength range while preferentially minimizing passage of electromagnetic radiation in at least one other wavelength range by absorbing at least some of the radiation of that wavelength range. In some embodiments a color layer will selectively allow passage of visible light of one wavelength range while reducing or minimizing passage of visible light of another wavelength range. In some embodiments a color layer will selectively allow passage of visible light of at least one wavelength range while reducing or minimizing passage of light of near-infrared (700-1400 nm) wavelength range. In some embodiments a color layer will selectively allow passage of near-infrared radiation while reducing or minimizing passage of visible light of at least one wavelength range. A color layer as defined herein performs wavelength-selective absorption of electromagnetic radiation by the use of a colorant (e.g. a dye or pigment) that is disposed in the color layer. A color layer is thus distinguished from a reflective layer (and from a transparent layer), as will be well understood by ordinary artisans based on the discussions herein.

Any such color layer 40 can be arranged so that light that is retroreflected by a retroreflective element 20 passes through the color layer so that the retroreflected light exhibits a color imparted by the color layer. A color layer 40 can thus be disposed so that at least a portion of layer 40 is located between rearward surface 23 of embedded area 25 of transparent microsphere 21 and forward surface 32 of embedded reflective layer 30 so that at least this portion of the color layer 40 is in the retroreflective light path. Thus, a forward surface 42 of color layer 40 may be in contact with a rearward surface of embedded area 25 of microsphere 21; and, a rearward surface 43 of color layer 40 may be in contact with forward surface 32 of embedded reflective layer 30. In some embodiments an above-mentioned intervening layer (e.g. a transparent layer) 50 may be present in addition to a color layer 40; such layers may be provided in any order (e.g. with the color layer forward of, or rearward of, the intervening layer) as desired. In some embodiments, a color layer 40 may serve some other function (e.g. as a bonding layer, an adhesion-promoting layer, or a tie layer) in addition to imparting color to the retroreflected light.

In some embodiments a color layer 40 may be a discontinuous color layer, e.g. a localized color layer as in the exemplary embodiment shown in FIG. 7. In particular embodiments a localized color layer 40 may be an embedded color layer (with the terms localized and embedded having the same meanings as used for reflective layers as discussed above). That is, an embedded color layer 40 may comprise minor edges 41 that are "buried" rather than being exposed edges. In various embodiments, a localized color layer may exhibit an average thickness (e.g. measured at several locations over the extent of the color layer) of from at least 0.1, 0.2, 0.5, 1, 2, 4, or 8 microns, to at most 40, 20, 10, 7, 5, 4, 3, 2 or 1 microns. In some embodiments an intervening layer 50 may be provided with colorant so that it serves as a color layer 40 (in addition to serving any or all of the above-listed functions).

The presence of color layers (e.g. localized, embedded color layers) in at least some of the retroreflective light paths of a retroreflective article can allow article 1 to comprise at least some areas that exhibit colored retroreflected light, irrespective of the color(s) that these areas (or any other areas of the article) exhibit in ambient (non-retroreflected) light. In some embodiments, an embedded reflective layer may be configured so that the entirety of the reflective layer is positioned rearwardly of a color layer. This can ensure that incoming light cannot reach the reflective layer (nor be reflected therefrom) without passing through the color layer, regardless of the angle at which the light enters and exits the transparent microsphere. Such arrangements can provide that light that is retroreflected from a retroreflective element exhibits a desired color, regardless of the entrance/exit angle of the light. Such arrangements can also enable the color layer to mask the reflective layer for advantageously enhanced color appearance in ambient (non-retroreflective) light. In other embodiments, an embedded reflective layer may be configured so that at least some portion of the reflective layer extends beyond a minor edge of the color layer so that light can be reflected from the reflective layer without passing through the color layer. Such arrangements can provide that retroreflected light can exhibit different colors depending on the entrance/exit angle of the light.

The previously mentioned parameters (e.g., the angular arc occupied by a layer, and the percentage of the embedded area of the microsphere that is covered by a layer) can be used for characterization of a localized, embedded color layer in relation to a transparent microsphere and in relation to an embedded reflective layer with which it shares a retroreflective light path. In various embodiments, at least some localized, embedded color layers 40 may be disposed so that they each occupy an angular arc comprising less than about 190, 170, 150, 130, 115, or 95 degrees. In further embodiments, at least some localized, embedded color layers may each occupy an angular arc of at least about 5, 15, 40, 60, 80, 90, or 100 degrees. In various embodiments, at least some embedded reflective layers may be disposed so that each occupies an angular arc that is less than that of a localized, embedded color layer with which it shares a retroreflective light path, by at least 5, 10, 15, 20, 25, or 30 degrees. In other embodiments, at least some embedded reflective layers may be disposed so that each occupies an angular arc that is greater than that of a localized, embedded color layer with which it shares a retroreflective light path, by at least 5, 10, 15, 20, 25 or 30 degrees.

Article 1 may be arranged to provide that the appearance of article 1 in ambient (non-retroreflected) light is controlled as desired. For example, in the exemplary arrangement of FIG. 7 the front surface 4 of article 1 is provided in part (e.g. in areas 8 of front side 2 of article 1 that are not occupied by transparent microspheres 21) by a visually exposed front surface 14 of binder layer 10. In such embodiments the appearance of front side 2 of article 1 in ambient light may thus be largely dominated by the color (or lack thereof) of binder layer 10 in areas 13 of binder layer 10 that are laterally between microspheres 21. Similar effects may be achieved in arrangements of the type shown in FIG. 1, if continuous layer 50 is a transparent layer. Thus in some embodiments binder layer 10 may be a colorant-loaded (e.g. pigment-loaded) binder layer. The pigment may be chosen to impart any suitable color in ambient light, e.g. fluorescent yellow, green, orange, white, black, and so on.

In some embodiments the appearance of retroreflective article 1 in ambient light may be manipulated e.g. by the presence and arrangement of one or more color layers on a front side of article 1. In some embodiments any such color layers, e.g. in combination with a colorant-loaded binder, may be configured so that the front side of article 1 exhibits a desired image (which term broadly encompasses e.g. informational indicia, signage, aesthetic designs, and so on) when viewed in ambient light. In some embodiments, article 1 may be configured (whether through manipulation of the embedded reflective layers and/or manipulation of any color layers in the retroreflective light path) to exhibit images when viewed in retroreflected light. In other words, any arrangement by which the appearance of article 1 in ambient light may be manipulated (e.g. by the use of a colorant-loaded binder, the use of colorant-loaded layers on the front side 4 of article 1, etc.) may be used in combination with any arrangement by which the appearance of article 1 in retroreflected light may be manipulated (e.g. by the use of color layers, e.g. localized, embedded color layers, in the retroreflective light path).

Such arrangements are not limited to the specific exemplary combinations discussed herein and/or shown in the Figures herein. Many such arrangements are discussed in detail in U.S. Provisional Patent Application No. 62/675,020 which is incorporated by reference herein in its entirety; it will be understood that any of the color arrangements discussed in the '020 application can be used with the embedded reflective layers disclosed herein.

Regardless of the particular color arrangement that may be used, it will be clear based on the discussions herein that the use of embedded reflective layers 30, particularly those that occupy covered areas 28 that are relatively small percentages (e.g. less than 60%) of embedded areas 25 of transparent microspheres 21, can allow significantly enhanced color fidelity of a retroreflective article 1 (e.g., a reflective article comprising a colorant-loaded binder layer 10) when viewed in ambient light. In other words, in ambient light the article may exhibit a color that more closely matches the native color of the colorant-loaded binder (that is, in ambient light the article may exhibit a color that is similar to that which would be exhibited by the article if the article did not comprise any retroreflective elements).

Transfer Article

Figure 8:
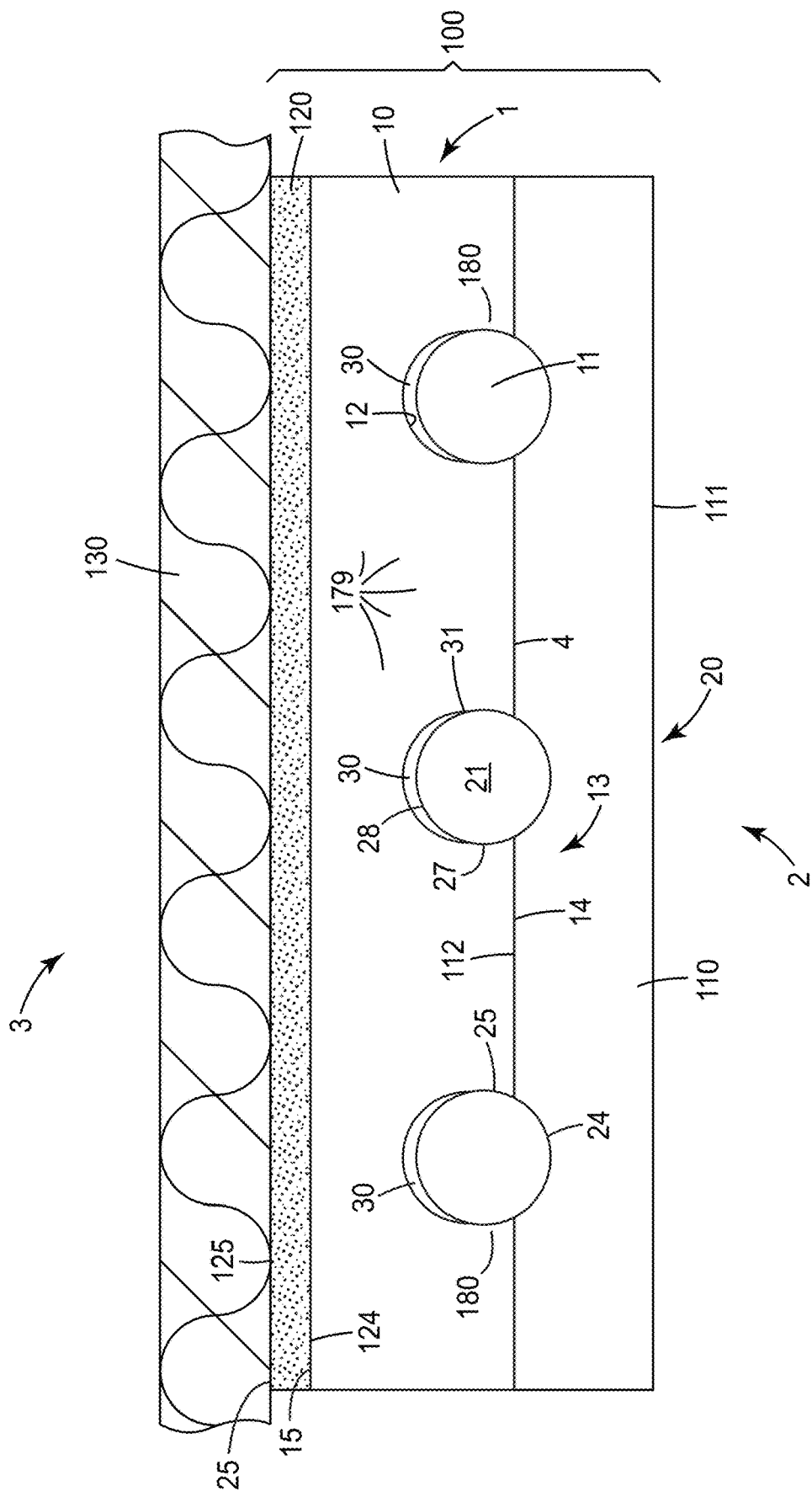
FIG. 8 is a side schematic cross sectional view of an exemplary transfer article comprising an exemplary retroreflective article, with the transfer article shown coupled to a substrate.

In some embodiments of the general type shown in FIG. 8, a retroreflective article 1 as disclosed herein may be provided as part of a transfer article 100 that comprises retroreflective article 1 along with a removable (disposable) carrier layer 110 that comprises front and rear major surfaces 111 and 112. In some convenient embodiments, retroreflective article 1 may be built on such a carrier layer 110, which may be removed for eventual use of article 1 as described later herein. For example, a front side 2 of article 1 may be in releasable contact with a rear surface 112 of a carrier layer 110, as shown in exemplary embodiment in FIG. 8.

Retroreflective article 1 (e.g. while still a part of a transfer article 100) may be coupled to any desired substrate 130, as shown in FIG. 8. This may be done in any suitable manner. In some embodiments this may be done by the use of a bonding layer 120 that couples article 1 to substrate 130 with the rear side 3 of article 1 facing substrate 130. Such a bonding layer 120 can bond binder layer 10 (or any layer rearwardly disposed thereon) of article 1 to substrate 130, e.g. with one major surface 124 of bonding layer 120 being bonded to rear surface 15 of binder layer 10, and with the other, opposing major surface 125 of bonding layer 120 bonded to substrate 130. Such a bonding layer 120 may be e.g. a pressure-sensitive adhesive (of any suitable type and composition) or a heat-activated adhesive (e.g. an "iron-on" bonding layer). Various pressure-sensitive adhesives are described in detail in U.S. Patent Application Publication No. 2017/0276844, which is incorporated by reference in its entirety herein.

The term "substrate" is used broadly and encompasses any item, portion of an item, or collection of items, to which it is desired to e.g. couple or mount a retroreflective article 1. Furthermore, the concept of a retroreflective article that is coupled to or mounted on a substrate is not limited to a configuration in which the retroreflective article is e.g. attached to a major surface of the substrate. Rather, in some embodiments a retroreflective article may be e.g. a strip, filament, or any suitable high-aspect ratio article that is e.g. threaded, woven, sewn or otherwise inserted into and/or through a substrate so that at least some portions of the retroreflective article are visible. In fact, such a retroreflective article (e.g. in the form of a yarn) may be assembled (e.g. woven) with other, e.g. non-retroreflective articles (e.g. non-retroreflective yarns) to form a substrate in which at least some portions of the retroreflective article are visible. The concept of a retroreflective article that is coupled to a substrate thus encompasses cases in which the article effectively becomes a part of the substrate.

In some embodiments, substrate 130 may be a portion of a garment. The term "garment" is used broadly, and generally encompasses any item or portion thereof that is intended to be worn, carried, or otherwise present on or near the body of a user. In such embodiments article 1 may be coupled directly to a garment e.g. by a bonding layer 120 (or by sewing, or any other suitable method). In other embodiments substrate 130 may itself be a support layer to which article 1 is coupled e.g. by bonding or sewing and that adds mechanical integrity and stability to the article. The entire assembly, including the support layer, can then be coupled to any suitable item (e.g. a garment) as desired. Often, it may be convenient for carrier 110 to remain in place during the coupling of article 1 to a desired entity and to then be removed after the coupling is complete. Strictly speaking, while carrier 110 remains in place on the front side of article 1, the areas 24 of transparent microspheres 21 will not yet be air-exposed and thus the retroreflective elements 20 may not yet exhibit the desired level of retroreflectivity. However, an article 1 that is detachably disposed on a carrier 110 that is to be removed for actual use of article 1 as a retroreflector, will still be considered to be a retroreflective article as characterized herein.

Methods of Making

In some convenient embodiments, a retroreflective article 1 can be made by starting with a disposable carrier layer 110. Transparent microspheres 21 can be partially (and releasably) embedded into carrier layer 110 to form a substantially mono-layer of microspheres. For such purposes, in some embodiments carrier layer 110 may conveniently comprise e.g. a heat-softenable polymeric material that can be heated and the microspheres deposited thereonto in such manner that they partially embed therein. The carrier layer can then be cooled so as to releasably retain the microspheres in that condition for further processing.

Typically, the microspheres as deposited are at least slightly laterally spaced apart from each other although occasional microspheres may be in lateral contact with each other. The pattern (that is, the packing density or proportional area coverage) of microspheres as deposited on the carrier will dictate their pattern in the final article. In various embodiments, the microspheres may be present on the final article at a packing density of at least 30, 40, 50, 60 or 70 percent (whether over the entire article, or in microsphere-containing macroscopic areas of the article). In further embodiments, the microspheres may exhibit a packing density of at most 80, 75, 65, 55 or 45 percent (noting that the theoretical maximum packing density of monodisperse spheres on a plane is in the range of approximately 90 percent). In some embodiments the microspheres may be provided in a predetermined pattern, e.g. by using the methods described in U.S. Patent Application Publication 2017/0293056, which is incorporated by reference herein in its entirety.

In various embodiments the microspheres 21 may be partially embedded in carrier 110 e.g. to about 20 to 50 percent of the microspheres' diameter. The areas 25 of microspheres 21 that are not embedded in the carrier protrude outward from the carrier so that they can subsequently receive reflective layer 30 and binder layer 10 (and any other layers as desired). These areas 25 (which will form the embedded areas 25 of the microspheres in the final article) will be referred to herein as protruding areas of the microspheres during the time that the microspheres are disposed on the carrier layer in the absence of a binder layer. In customary manufacturing processes, there may be some variation in how deeply the different microspheres are embedded into carrier 110, which may affect the size and/or shape of the reflective layers that are locally laminated onto portions of the protruding surfaces of the different microspheres.

An exemplary carrier layer comprising transparent microspheres thereon is described in the Working Examples herein as a Temporary Bead Carrier. Further details of suitable carrier layers, methods of temporarily embedding transparent microspheres in carrier layers, and methods of using such layers to produce retroreflective articles, are disclosed in U.S. Patent Application Publication No. 2017/0276844.

After microspheres 21 are partially embedded in carrier 110, reflective layers (that will become embedded reflective layers after formation of binder layer 10) can be formed on portions of protruding areas 25 of at least some of the microspheres (again, protruding areas 25 will become embedded areas after binder layer 10 is formed).

In many embodiments local lamination may be performed so that a reflective layer is transferred to only on portions of protruding areas 25 of microspheres 21 and not, for example, to the surface 112 of the carrier 110. Any such process may be controlled so that the reflective layer is not transferred to the entirety of the protruding area 25 of a microsphere 21. That is, in some instances the process may be carried out so that a reflective layer is transferred only to an outermost portion of the protruding area 25 of microsphere 21 (which outermost portion will become the rearmost portion of embedded area 25 of microsphere 21 in the final article).

By way of a specific example with reference to FIG. 5, a microsphere 21 may be disposed on a carrier so that approximately 40% of the microsphere diameter is embedded in the carrier. Thus, an area 25 of microsphere 21 will protrude outward from a major surface of the carrier layer, to a maximum distance that corresponds to approximately 60% of the diameter of the microsphere. A local lamination process may be performed so that the reflective layer only covers outermost portion 28 (e.g. occupying an angular arc of approximately 80-85 degrees) of protruding area 25 of the microsphere. After the transfer is complete, a remaining portion 27 of protruding area 25 of microsphere 21 will not comprise a reflective layer 30 thereon. Upon formation of a binder layer 10, a retroreflective element 20 will be formed comprising a microsphere 21 and reflective layer 30 arranged in the general manner depicted in FIG. 5. That is, reflective layer 30 will cover only a generally rearward portion 28 of embedded area 25 of microsphere 21, and will not cover the remaining (e.g. forward) portion 27 of embedded area 25.

To perform the herein-described local lamination of reflective layers onto protruding portions of transparent microspheres, arrangements must be made that enable a pre-made reflective layer to be brought into contact with carrier-borne transparent microspheres and portions of the pre-made reflective layer laminated thereto. Such arrangements can be facilitated by providing the reflective layer as part of a multilayer transfer stack that includes a release interface that allows the reflective layer to be separated from other layers of the stack. In some embodiments of this general type, a reflective layer 30 may be provided as part of a multilayer transfer stack 350 as shown in exemplary embodiment in FIG. 9. Exemplary transfer stack 350 includes reflective layer 30, which itself comprises a reflecting layer 301 sandwiched between a forward embrittlement layer 302 and a rearward selective-bonding layer 303. Transfer stack 350 further includes a releasable support assembly 360, which comprises a support substrate 361 and a release layer 362. These layers are arranged so that a rearward surface of selective-bonding layer 303 is in contact with a forward surface of release layer 362 to form a release interface 331. The forward surface of selective-bonding layer 303 is in contact with reflecting layer 301 and is non-releasably bonded thereto. Layer 303 thus establishes a selective-release interface 331 and a selective-bonding interface 332, hence the designation of layer 303 as a selective-bonding layer.

Figure 9:
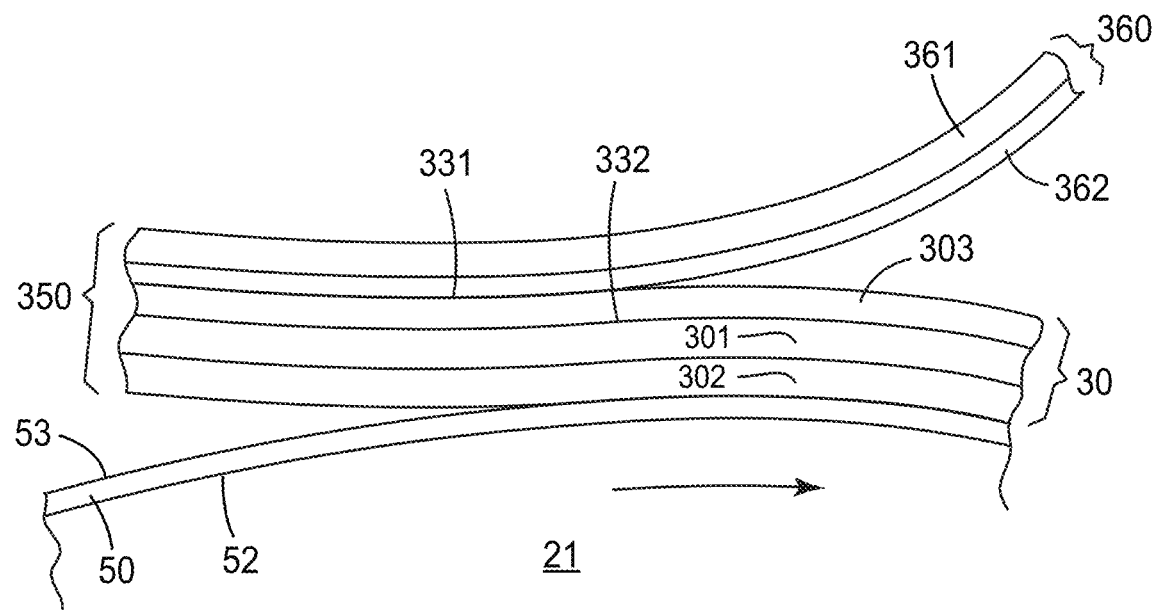
FIG. 9 is a side schematic cross sectional view of an exemplary process for locally laminating a reflective layer to a portion of a protruding transparent microsphere.

Multilayer transfer stack 350 may be brought into contact with a protruding portion of a carrier-borne microsphere 21, as shown in exemplary embodiment in FIG. 9. The forwardmost surface of the transfer stack (in this case, a forward surface of embrittlement layer 302) is brought into contact with surface 53 of a bonding layer 50 provided on at least the protruding portion of microsphere 21. A bond is established between layer 302 and bonding layer 50. Transfer stack 350 having been configured so that interface 331 is a selectively-releasable (weakly-bonded) interface, reflective layer 30 (including embrittlement layer 302, reflecting layer 301, and selective-bonding layer 303) will remain bonded to the protruding portion of the microsphere while releasable support assembly 360 is released from reflective layer 30 (at selective-release interface 331) and is removed.

FIG. 9 is an idealized cross-sectional depiction that does not capture the fact that the lamination is occurring along the multiple-axis-of-curvature surface of the microsphere. Thus, along with the reflective layer 30 releasing from the releasable support assembly 360 as shown in FIG. 9, the local area of pre-made reflective layer 30 that is laminated to microsphere 21 will break away from the region of the pre-made reflective layer that formerly laterally surrounded the local area. (Regions of pre-made reflective layer 30 that are not transferred to the microsphere will typically remain with, and be removed with, the releasable support assembly 360.) The compositions of the various above-described layers can be chosen as desired.

Support substrate 361 of releasable support assembly 360 may be e.g. any suitable organic polymeric film, e.g. polyester, biaxially-oriented polypropylene, and so on. Other potentially useful materials for support substrate 361 are described in the above-cited '992 application.

Release layer 362 may be any suitable material that can be disposed, e.g. deposited, on a major surface of support substrate 361 or any layer thereon. In some embodiments release layer 362 can include a metal layer. The metal layer may include at least one selected from the group consisting of individual metals, two or more metals as mixtures, inter-metallics or alloys, semi-metals or metalloids, metal oxides, metal and mixed metal oxides, metal and mixed metal fluorides, metal and mixed metal nitrides, metal and mixed metal carbides, metal and mixed metal carbonitrides, metal and mixed metal oxynitrides, metal and mixed metal borides, metal and mixed metal oxy borides, metal and mixed metal silicides, diamond-like carbon, diamond-like glass, graphene, and combinations thereof. In some embodiments, the metal layer may conveniently be formed of Al, Zr, Cu, Ni, Cr, Ti, or Nb. In some embodiments release layer 362 can include a doped semiconductor layer. In some embodiments, the doped semiconductor layer may conveniently be formed of Si, B-doped Si, Al-doped Si, and/or P-doped Si. In various embodiments, release layer 362 can be prepared by evaporation, reactive evaporation, sputtering, reactive sputtering, chemical vapor deposition, plasma enhanced chemical vapor deposition, and atomic layer deposition. Preferred methods include vacuum preparations such as sputtering and evaporation.

Selective-bonding layer 303 may comprise any material that exhibits the desired combination of releasability at one major surface and bonding at the other, opposing major surface. In many embodiments such a material may be chosen from various (meth)acrylate and/or (meth)acrylamide materials as discussed in detail in the above-cited '992 provisional application. If the selective-bonding layer is to be formed by flash evaporation of the monomer, vapor deposition, followed by crosslinking, volatilizable (meth)acrylate and/or (meth)acrylamide monomers or oligomers may be used. Suitable materials will exhibit sufficient vapor pressure to be evaporated in an evaporator and condensed into a liquid or solid coating in a vapor coater. Examples of potentially suitable materials are listed in the '992 provisional application. Tricyclodecane dimethanol diacrylate is a particular example of a suitable material, and may be conveniently applied by, e.g., condensed organic coating followed by UV, electron beam, or plasma initiated free radical polymerization.

Reflecting layer 301 may be any suitable reflecting layer (e.g. a layer of metal such as silver or aluminum, or a metal alloy) or collection of sublayers (e.g. it may be a dielectric stack).

Embrittlement layer 302 may be any layer that exhibits suitably brittle properties that can enhance the ability of a transferred area of a pre-made reflective layer to break away from regions of the pre-made reflective layer that previously laterally surrounded the transferred area. (It is emphasized, however, that such an embrittlement layer is optional and that many working example samples have been successfully produced in the absence of an embrittlement layer.) Many silicon oxides (e.g. silicon aluminum oxide ($SiAlO_x$), as achieved e.g. by sputter-coating from a target comprising silicon and aluminum, in an oxygen-containing atmosphere) may be well-suited for such applications (noting again that the embrittlement layer is optional and may be included or omitted in various circumstances).

The thicknesses of the various layers can be chosen as desired. In various embodiments, the embrittlement layer may vary in thickness from e.g. 1, 2, 4 or 6 nm to 100, 80, 60, 40, 30 or 20 nm. In various embodiments, the reflecting layer may vary from e.g. 10, 20, 40 or 80 nm to 40, 20, 10, 7, 5, 4, 3, 2 or 1 microns. In various embodiments, the selective-bonding layer may vary from e.g. 20, 40 or 60 nm to 500, 400, 300, 200 or 100 nm. In various embodiments, the release layer may vary from e.g. 2, 4 or 6 nm to 40, 30 or 20 nm. In various embodiments, the support substrate may vary from e.g. 0.5, 1.0, 2, or 4 mils, to 20, 10, 6, 3, 1.5 or 0.6 mils.

In many convenient embodiments, a multilayer transfer stack 350 may be built starting with a support substrate 361 (e.g. biaxially-oriented polypropylene (BOPP)) that is provided with a release layer 362, e.g. a metal coating such as an aluminum coating) to thus provide a releasable support assembly 360. The Heatseal Film-1 (aluminized BOPP) referred to in Working Example 2.3.1 Part A is one example of a releasable support assembly 360 that can be obtained in the form of a polymer substrate already bearing a suitable release layer. The remaining layers can then be sequentially deposited on the release-layer-bearing side of the support substrate, starting with the selective-bonding layer 303. The Acrylate-1 layer, the silver reflector layer, and the silicon aluminum oxide layer, that are described in Working Example 2.3.1 Part A, are respectively examples of a suitable selective-bonding layer 303, reflecting layer 301, and embrittlement layer 302.

Some selective-bonding materials that may be used in a selective-bonding layer 303, in particular (meth)acrylate materials of the type described in the above-cited '992 application, have been found to exhibit selective release/bonding depending on the order of deposition. Thus for example, depositing such a (meth)acrylate layer onto an existing metal layer may result in easy release, while depositing a metal layer onto an existing (meth)acrylate layer may result in excellent bonding. This may be true even in cases in which the (meth)acrylate layer is sandwiched between two metal layers of the same composition. It will thus be evident that such (meth)acrylate materials are suited for providing a layer 303 that will preferentially remain bonded to a reflecting layer 301 and will preferentially release from a release layer 362, even in particular embodiments in which reflecting layer 301 and release layer 362 are comprised of the same metal composition.

A process of the general type depicted in FIG. 9 will thus produce a reflective layer of the general type shown in FIG. 2. In such arrangements, embrittlement layer 302 will be in the retroreflected light path and will thus be chosen to ensure that it does not unacceptably affect the retroreflective performance. In some such embodiments the embrittlement layer is transparent to the retroreflected light. Often, such an embrittlement layer will be relatively thin (e.g. 50, 30, 20, or 10 nm or less). Although the exemplary depiction of FIG. 9 shows the releasable support assembly 360 being removed in-line with the lamination of the reflective layer 30 to the microsphere, in practice this removal may be performed later; for example, a set of carrier-borne microspheres with a transfer stack 350 disposed thereon, may be stored e.g. as a roll good with the releasable support assembly 360 being released and removed at a later time.

Figure 10:
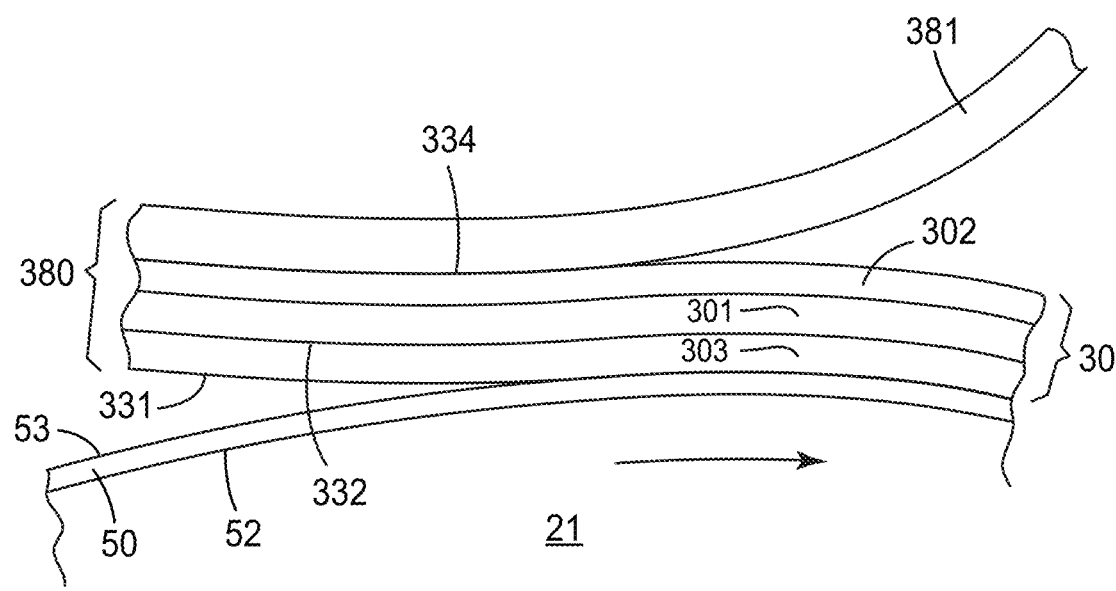
FIG. 10 is a side schematic cross sectional view of another exemplary process for locally laminating a reflective layer to a portion of a protruding transparent microsphere.

As noted earlier, in some embodiments a reflective layer 30 may comprise an arrangement of the general type shown in FIG. 3, in which the position of embrittlement layer 302 and selective-bonding layer 303 are swapped from that shown in FIG. 2. Such arrangements may be obtained using a modified version of the lamination process described above, using a conformally-supported transfer stack 380 as shown in exemplary embodiment in FIG. 10. In such an approach, a preliminary assembly (not shown in FIG. 10) may be made that comprises a releasable support assembly of the general type described above. Onto the release layer of this assembly may be successively deposited a selective-bonding layer 303, a reflecting layer 301, and an embrittlement layer 302, to make the preliminary assembly. Such a preliminary assembly may then be laminated to a suitable conformal substrate 381 (described in detail below), with a major surface of embrittlement layer 302 in contact with a major surface of conformal substrate 381. The conformal substrate can be configured so that the bonding force between these two surfaces (at interface 334 of FIG. 10), and the bonding forces between the other layers, are all greater than the bonding force between the selective-bonding layer 303 and the release layer of the releasable support assembly. The releasable support assembly can thus be detached from the other layers to leave behind conformally-supported transfer stack 380 as shown in FIG. 10. In FIG. 10, the releasable support assembly has already been removed and is thus not shown; however, the number 331 indicates the position of the interface that previously existed between selective-bonding layer 303 and the release layer of the releasable support assembly. This approach thus uses the selective bonding/release properties of layer 303 to release a transfer stack from a preliminary assembly, in a preliminary step that occurs before the actual lamination of the reflective layer to the microsphere.

The above-described preliminary process will thus produce a conformally-supported transfer stack 380 of the general type shown in FIG. 10. This transfer stack can then be brought in contact with a protruding portion of a transparent microsphere (i.e., in contact with a bonding layer 50 present thereon) to perform a local lamination process in the general manner described above. After performing the lamination, the conformal substrate 381 can be removed at any suitable time, either in-line with lamination or at some later time. This can be achieved by ensuring that the bonding force at interface 334 between the surface of conformal substrate 381 and embrittlement layer 302 (or reflecting layer 301 if no embrittlement layer is present) is less than the bonding force at all other interfaces. In such arrangements, selective-bonding layer 303 will be in the retroreflected light path and will thus be chosen to ensure that it does not unacceptably affect the retroreflective performance. In some such embodiments the selective-bonding layer is transparent to the retroreflected light.

The differences of the process (and resulting product) of FIG. 10 from the earlier-described process of FIG. 9 are twofold. First, the location of the selective-bonding layer 303 (and of the optional embrittlement layer 302, if present) relative to the retroreflective light path is different, as noted above. Beyond this, the use of a conformal substrate 381 can allow the reflective layer 30 (including all of its component layers) to be more aggressively locally conformed along the multi-dimensionally-curved surface of the transparent microsphere. In some embodiments, the use of a more aggressively conformable substrate 381 may produce a locally-laminated reflective layer that exhibits a greater percent area coverage (e.g. that occupies a greater angular arc) of the embedded area of the microsphere. However, as discussed later, there are various parameters and process conditions that can be manipulated in order to affect the percent area coverage of the reflective layer; thus it is not necessarily required that a conformal substrate be used in order to achieve a high percent area coverage.

Any sheet-like or film-like material (e.g. an organic polymeric sheet or film) that exhibits suitable conformability may be a possible candidate for a conformal substrate 381. Any such material will be chosen so that it is releasable from the surface of embrittlement layer 302 (or e.g. from the surface of reflecting layer 301 if an embrittlement layer 302 is not present) so that conformal substrate 381 can be separated therefrom after lamination of the reflective layer to the microsphere. However, the material must also be chosen so that it bonds to either such layer more strongly than the bonding strength of the selective-bonding layer 303 to the release layer of the release assembly (so that the release assembly can be removed in the above-described preliminary step). Various organic polymeric materials may be suitable for fulfilling this role. For example, suitable materials may be chosen from styrene-isoprene rubber, styrene-butadiene rubber, butyl rubber, and so on. Some such materials may be chosen from styrenic-rubber block copolymers of the general type known as KRATON polymers, e.g. KRATON SIS (available from KRATON POLYMERS LLC; Houston, TX). In some embodiments, multilayer materials that comprise a highly-elastomeric core sandwiched between less-elastomeric skins comprised of polyolefin plastomers (as described in Working Example 2.3.2) have been found to be particularly suitable.

In some embodiments a conformal substrate may be highly conformable along all dimensions (for example, it may not possess asymmetric mechanical properties of the type exhibited by some highly-oriented polymer films). In some embodiments, a conformal substrate may be configured to be elastically conformable. For example, the substrate may exhibit an elongation at break of at least 200, 400, or 600 percent, and may be a single-layer or multilayer construction as noted earlier herein. In various embodiments, such a substrate may be from e.g. 10, 20, 50, or 100 microns in thickness to 5000, 2000, 1000, 500, 400, or 200 microns in thickness.

The above-described local lamination of reflective layers to protruding portions of transparent microspheres (whether by "direct" lamination of the general type shown in FIG. 9, or lamination that is assisted by a conformal substrate, in the general manner shown in FIG. 10) may be carried out in any suitable manner. In many convenient embodiments, it may be performed by bringing together the carrier-borne microspheres and the transfer stack in a lamination nip between two backing rolls. The conditions under which this is performed may be varied as desired. In particular, the process conditions may be varied to affect the extent to which each locally-laminated reflective layer covers the protruding area of the microsphere. (This extent of coverage will be manifested as the previously-described percent area coverage, indicating the extent to which the reflective area covers the microsphere, after the final retroreflective article is made.) It will be appreciated that in general it will not be possible to "wrap" a reflective layer around the protruding portion of a microsphere to a wrap angle of more than 180 degrees (in other words, to cover more than half of the total surface area of the microsphere with the reflective layer.) In fact, in many embodiments it may be desirable to restrict the coverage of the microsphere by the reflective layer to an area coverage that is lower, e.g. significantly lower, than 50% of the total surface area of the microsphere.

It has already been noted that the presence or absence of a conformal substrate in the lamination process may affect the area coverage of the microspheres that is achieved by the reflective layer. It has also been found that the hardness of the first and second backing rolls that respectively support the carrier-borne microspheres and the transfer stack during lamination can be usefully adjusted. In some embodiments, one or both backing rolls may be hard-surfaced (e.g. one or both may comprise a metal surface such as steel), e.g. with a Rockwell Hardness (HRC) of at least 40. In some embodiments, one or both backing rolls may be soft-surfaced, e.g. with an elastomeric or rubberized coating (e.g. with a Shore A hardness of less than 100, 80, 70, 60, or 50). In instances in which one backing roll is hard-surfaced (e.g. steel) and the other is soft-surfaced (e.g. rubberized), best performance may be obtained with the soft-surfaced roll supporting the transfer stack and the hard-surfaced roll supporting the carrier-borne microspheres.

The pressure with which the backing rolls are urged toward each other during the lamination process (e.g. from a low value of approximately 50 pounds per linear inch, to a moderate value of approximately 400 pounds per linear inch, to a high value of approximately 1700 pounds per linear inch) can also be manipulated, with higher pressures leading to higher area coverage of the microspheres by the reflective layers, as expected. In general, the presence of a conformal substrate was found to significantly lower the lamination pressure needed to achieve a given area coverage.

In general, many process conditions have been found which allow acceptable area coverage of transparent microspheres by reflective layers, along with a level, and size, of bridging reflective layers that does not cause any unacceptable optical effects. In some instances, a lamination operation may only result in reflective layers being transferred to a small percentage (e.g. from at least 5, 10, or 20%, to at most 40, 30, 20 or 10%) of the transparent microspheres. In some other instances, a lamination operation may result in reflective layers being transferred to a large percentage (e.g. from at least 50, 60, or 80%, to at most 100, 95, 90, 80 or 60%) of the transparent microspheres.

Regardless of the particular ordering of layers and processing steps, the arrangements described herein provide that a local area of a pre-made reflective layer can be bonded to a portion of a protruding area of a transparent microsphere with sufficient strength to allow this local area of the reflective layer to release (delaminate) from remaining layers of a multilayer transfer stack and also to allow this local area of the reflective layer to break away from the regions of the reflective layer that previously laterally surrounded this local area. A suitable bonding layer can be used to locally bond this local area of a reflective layer to a protruding area of a transparent microsphere. In many embodiments, an intervening layer 50 as discussed elsewhere herein may be used as a bonding layer, as long as it exhibits suitable bonding properties.

In various embodiments, a bonding layer may be any layer of organic polymeric material that is disposed at least atop the protruding areas of the microspheres and that can be processed (e.g. softened) sufficiently to allow a reflective layer to be locally bonded thereto. In some embodiments such softening may occur by virtue of local pressure applied in the lamination process (since the lamination force will be concentrated on the actual portions of the microspheres that are contacted by the transfer stack). Thus in some embodiments it may not be necessary to provide an elevated temperature (e.g. by heating one or both of the backing rolls of the lamination nip) in order to perform the herein-disclosed local lamination. In such embodiments the lamination may be performed under ambient conditions, e.g. at a temperature in the range of approximately 20-22° C.

In some embodiments, a bonding layer may be provided by a layer of organic polymeric material (e.g. an intervening layer) that is disposed atop at least portions of the protruding areas of carrier-borne transparent microspheres and that is configured so that under appropriate lamination conditions a reflective layer may be locally bonded thereto. Some such layers may serve some other purpose, e.g. they may serve as a protective layer that e.g. provides abrasion resistance, corrosion resistance, or the like. Protective layers that can serve as bonding layers, and compositions thereof, are described in detail in U.S. Patent Application Publication No. 2017/0276844, which is incorporated by reference in its entirety herein. In particular embodiments, such a layer may be comprised of a polyurethane material. Various polyurethane materials that may be suitable for such purposes are described e.g. in U.S. Patent Application Publication No. 2017/0131444, which is incorporated by reference in its entirety herein.

In some embodiments, a bonding layer may be used that exhibits pressure-sensitive adhesive properties e.g. at room temperature. Such approaches may provide that the local lamination process may be performed with relatively low laminating pressures. In some such embodiments, such a pressure-sensitive adhesive may be disposed atop at least a portion of the protruding areas of the carrier-borne microspheres to form a localized bonding layer, e.g. by a transfer process such as e.g. flexographic printing of an adhesive precursor. In some particular embodiments of this type, such a bonding layer (e.g. a flexographically-printed bonding layer) may include a colorant. Thus, such a layer may serve as a localized color layer as described earlier herein, and may also serve as a bonding layer for a locally-laminated reflective layer.

In various embodiments, such a bonding layer, if it is a separate layer from the aforementioned localized color layer, may be disposed atop the carrier-borne transparent microspheres after the localized color layer is disposed thereon. It will be understood that a local lamination process encompasses physical transfer of a reflective layer to a protruding area of a transparent microsphere, regardless of what layer(s) may already be present on the protruding area of the microsphere.

In some embodiments, such a bonding layer may be present in a continuous manner (e.g. including portions that are present on the front side of the retroreflective article as with layer 50 in the exemplary arrangement of FIG. 1). In other embodiments, such a bonding layer may be a discontinuous bonding layer that is present only in the local area of the protruding area of transparent microspheres that it is desired to laminate a reflective layer to, in a similar manner as shown for color layer 40 in the exemplary arrangement of FIG. 7. Such a discontinuous bonding layer may be locally provided e.g. by flexographic printing or the like.

It is noted that even if a bonding layer is continuous rather than discontinuous, the lamination process may be performed so that the reflective layer only contacts (and thus transfers to) the areas of the bonding layer that are actually contacted by the reflective layer. Thus in many embodiments the reflective layer may only transfer to a farthest-protruding area of a transparent microsphere and will not transfer to other areas of the transparent microsphere. As noted earlier, in any event the reflective layer will not be transferred to an area that is greater than 50% of the total surface area of the transparent microsphere.

After formation of the locally-laminated reflective layers is carried out, a binder precursor (e.g., a mixture or solution of binder layer components) can be applied to microsphere-bearing carrier layer 110. The binder precursor may be disposed, e.g. by coating, onto the microsphere-loaded carrier layer and then hardened to form a binder layer, e.g. a continuous binder layer. The binder may be of any suitable composition, e.g. it may be formed from a binder precursor that comprises an elastomeric polyurethane composition along with any desired additives, etc. Binder compositions, methods making binders from precursors, etc., are described in U.S. Patent Application Publication Nos. 2017/0131444 and 2017/0276844, which are incorporated by reference in their entirety herein.

In general, binder layer 10 is configured to support transparent microspheres 21 and is typically a continuous, fluid-impermeable, sheet-like layer. In various embodiments, binder layer 10 may exhibit an average thickness of from 1 to 250 micrometers. In further embodiments, binder layer 10 may exhibit an average thickness of from 30 to 150 micrometers. Binder layer 10 may include polymers that contain units such as urethane, ester, ether, urea, epoxy, carbonate, acrylate, acrylic, olefin, vinyl chloride, amide, alkyd, or combinations thereof. A variety of organic polymer-forming reagents can be used to make the polymer. Polyols and isocyanates can be reacted to form polyurethanes; diamines and isocyanates can be reacted to form polyureas; epoxides can be reacted with diamines or diols to form epoxy resins, acrylate monomers or oligomers can be polymerized to form polyacrylates; and diacids can be reacted with diols or diamines to form polyesters or polyamides. Examples of materials that may be used in forming binder layer 10 include for example: Vitel™ 3550 available from Bostik Inc., Middleton, MA; Ebecryl™ 230 available from UBC Radcure, Smyrna, GA.; Jeffamine™ T-5000, available from Huntsman Corporation, Houston, TX.; CAPA 720, available from Solvay Interlox Inc., Houston TX; and Acclaim™ 8200, available from Lyondell Chemical Company, Houston, TX.

In some embodiments binder layer 10 may be at least generally visibly transmissive (e.g. transparent). In many convenient embodiments binder layer 10 may comprise one or more colorants. In particular embodiments a binder may comprise one or more fluorescent pigments. Suitable colorants (e.g. pigments) may be chosen e.g. from those listed in the above-cited '444 and '844 Publications.

In some embodiments, binder layer 10 may contain reflective particles 179, e.g. flakes, of reflective material (e.g. nacreous or pearlescent material), so that at least a portion of binder layer 10 that is adjacent to transparent microsphere 21 can function as a secondary reflective layer 180 as depicted in exemplary embodiment in FIG. 8. By a "secondary" reflective layer is meant a layer of binder layer 10 that serves to enhance the performance of a retroreflective element above the performance provided by a locally-laminated "primary" reflective layer 30 that covers an area 28 of a transparent microsphere. A secondary reflective layer 180 by definition operates adjacent a portion 27 of embedded area 25 of the transparent microsphere 21 that is not covered by the locally-laminated reflective layer 30. Such a secondary reflective layer (which may not necessarily have a well-defined rearward boundary) may provide at least some retroreflection due to the aggregate effects of the reflective particles that are present in the layer. It will be appreciated that such a secondary reflective layer may not necessarily provide the same amount and/or quality of retroreflection that is provided by a locally-laminated reflective layer 30. However, such a secondary reflective layer may provide that, for example, areas 27 of transparent microspheres, that are not covered by locally-laminated reflective layers 30, may nevertheless exhibit some retroreflectivity. Thus, in some embodiments, the locally-laminated reflective layers 30 may act as primary reflectors that provide retroreflection e.g. at light-incidence angles that are generally aligned with the front-rear axis of the article, while the secondary reflective layers 180 may provide at least some secondary retroreflection e.g. at high or glancing angles of incident light. Furthermore, this may be done while still preserving at least a significant portion of the previously-described enhanced color fidelity that is enabled by the absence of any locally-laminated reflective layers 30 in portions 27 of embedded areas 25 of microspheres 21.

To achieve such effects, in various embodiments binder layer 10 may be loaded with reflective particles 179 at a loading of at least 0.05, 0.10, 0.20, 0.50, 1.0, 2.0, or 5.0 weight percent. In further embodiments, binder layer may comprise less than 8, 7, 6, 4, 2.0, 1.5, 0.8, 0.4, 0.3, or 0.15 weight percent reflective particles. (All such loadings are on a dry-solids basis rather than including any liquid or volatile material that does not remain in the binder layer.) In various embodiments, the reflective particles may comprise an average particle size (diameter or effective diameter) of at least 5 microns; in further embodiments the reflective particles may comprise an average particle size of at most about 100 microns. It is noted that in many embodiments the reflective particles may be e.g. flake-like, with a high aspect ratio of e.g. greater than 2.0, 4.0, or 8.0. In such cases, the reflective particles may comprise, on average, a longest dimension of from at least 5 microns to at most 200 microns.

In some embodiments it may be particularly advantageous that the average particle size (or the average longest dimension, in the case of high aspect ratio particles) of the reflective particles in the binder be chosen to be smaller than the average particle size (diameter) of the transparent microspheres. Thus in various embodiments the average particle size of the reflective particles in the binder may be no more than 40%, 20%, 10%, or 5%, of the average particle size of the transparent microspheres.

Suitable reflective particles may be chosen from e.g. nacreous pigment flakes such as BiOCl, $TiO_2$-coated mica, oxide-coated glass flakes, hexagonal $PbCO_3$ particles, oxide-coated fluorphlogopite platelets, and crystalline guanine platelets (obtained e.g. from fish scales). In various particular embodiments, secondary reflective layers 180 resulting from the presence of reflective particles 179 in binder layer 10, may be used in combination with embedded reflective layers 30 that exhibit an area coverage (i.e., that comprise a covered portion 28 of an embedded area 25) of less than 50, 40, 30, 20 or even 10 percent. In various embodiments, such secondary reflective layers may be used in combination with embedded reflective layers that exhibit an angular arc of less than 80, 60, 50, 40, 30, 20 or 10 degrees. In some embodiments, binder layer 10 will comprise less than 8.0, 7.5, 7.0, 6.0, 5.0, 4.0, 2.0, 1.5, 0.8, 0.4, 0.3, or 0.15 weight percent (total dry solids basis) nacreous reflective particles of any type (e.g. BiOCl, $PbCO_3$, guanine, etc.).

In some embodiments, any other layer may be provided rearwardly behind binder layer 10 (e.g. between binder layer 10 and a bonding (e.g. pressure-sensitive adhesive) layer 120), or between reflective layer 30 and binder layer 10, for any purpose. Thus in some embodiments e.g. in which binder layer 10 is at least partially visibly transmissive, a layer may be provided that includes an image that is visible, through binder layer 10, in ambient light. In a variation of such an approach, an image may be printed on the rearward surface 124 of binder layer 10. In some embodiments, a layer bearing a visible image can be printed behind reflective layer 30 prior to the application of binder layer 10.

Discussions herein have primarily concerned articles of the general types shown e.g. in FIGS. 1 and 8 (including a binder layer, and in the form of e.g. a transfer article). However, in some embodiments the arrangements disclosed herein, comprising embedded reflective layers 30 or their equivalents, may be provided in an article that does not comprise a binder layer. Such an article will be termed an "intermediate" article for convenience of description. As shown in exemplary embodiment in FIG. 11, in embodiments of this type, an intermediate article 1000 may take the form of a carrier layer 110 bearing transparent microspheres 21 on a first surface 112 thereof, without any binder layer being present. (However, transparent microspheres 21 may be protected e.g. by a removable cover film provided on the microsphere-bearing side of the carrier layer, if desired.) Such an intermediate article will comprise at least some transparent microspheres 21 that comprise protruding areas 25 on portions 28 of which are provided locally-laminated reflective layers 30. Strictly speaking these reflective layers 30 will not be "embedded" layers until a binder layer 10 is present. So, in embodiments of this particular type, such reflective layers will be equivalently characterized as being "isolated" reflective layers, meaning that they cover a portion, but do not cover the entirety of, the protruding areas 25 of the microspheres. The various characterizations of embedded reflective layers in terms of percent area coverage, angular arcs, and so on, will be understood to be applicable in similar manner to isolated reflective layers in intermediate articles in which a binder layer has not yet been disposed to form the final article.

In some embodiments, an intermediate article may comprise an intervening layer 50 of the general type described elsewhere herein. Other layers (e.g. color layers 40, bonding layers 120, and/or a substrate 130) may be included in the intermediate article as desired. Any such carrier layer 110 as disclosed herein may be disposable, which term broadly encompasses carrier layers that are removed before actual use of the retroreflective article, after which the carrier layer is disposed, recycled, repurposed, and so on.

An intermediate article, comprising transparent microspheres with locally-laminated, isolated reflective layers thereon, can be further processed in any desired manner. In some embodiments, a binder layer e.g. comprising any desired colorant may be disposed onto the microsphere-bearing carrier layer in order to form an article 1. Intermediate articles of any suitable configuration may be shipped to customers who may, for example, dispose binder layers thereon to form customized articles.

Discussions herein have primarily concerned retroreflective articles in which areas 24 of microspheres 21 that are exposed (i.e., that protrude) forwardly of binder layer 10, are exposed to an ambient atmosphere (e.g., air) in the final retroreflective article as used. In other embodiments, the exposed areas 24 of microspheres 21 may be covered by, and/or reside within, a cover layer that is a permanent component of article 1. Such articles will be termed encapsulated-lens retroreflective articles. In such cases, the transparent microspheres may be chosen to comprise a refractive index that performs suitably in combination with the refractive index of the cover layer. In various embodiments, in an encapsulated-lens retroreflective article, the microspheres 21 may comprise a refractive index (e.g. obtained through the composition of the material of the microspheres, and/or through any kind of surface coating present thereon) that is at least 2.0, 2.2, 2.4, 2.6, or 2.8. In some embodiments, a cover layer of an encapsulated-lens retroreflective may comprise sublayers. In such cases, the refractive indices of the microspheres and the sublayers may be chosen in combination.

In some embodiments, such a cover layer may be a transparent layer. In other embodiments, the entirety, or selected regions, of a cover layer may be colored (e.g. may include one or more colorants) as desired. In some embodiments, a cover layer may take the form of a pre-existing film or sheet that is disposed (e.g. laminated) to at least selected areas of the front side of article 1. In other embodiments, a cover layer may be obtained by printing, coating or otherwise depositing a cover layer precursor onto at least selected areas of the front side of article 1, and then transforming the precursor into the cover layer.

As noted earlier herein, in some embodiments a color layer 40 may perform wavelength-selective absorption of electromagnetic radiation at at least somewhere in a range that includes visible light, infrared radiation, and ultraviolet radiation, by the use of a colorant that is disposed in the color layer. The term colorant broadly encompasses pigments and dyes. Conventionally, a pigment is considered to be a colorant that is generally insoluble in the material in which the colorant is present and a dye is considered to be a colorant that is generally soluble in the material in which the colorant is present. However, there may not always be a bright-line distinction as to whether a colorant behaves as a pigment or a dye when dispersed into a particular material. The term colorant thus embraces any such material regardless of whether, in a particular environment, it is considered to be a dye or a pigment. Suitable colorants are described and discussed in detail in the aforementioned U.S. Provisional Patent Application 62/675,020.

Transparent microspheres 21 as used in any article disclosed herein may be of any suitable type. The term "transparent" is generally used to refer to a body (e.g. a glass microsphere) or substrate that transmits at least 50% of electromagnetic radiation at a selected wavelength or within a selected range of wavelengths. In some embodiments, the transparent microspheres may transmit at least 75% of light in the visible light spectrum (e.g., from about 400 nm to about 700 nm); in some embodiments, at least about 80%; in some embodiments, at least about 85%; in some embodiments, at least about 90%; and in some embodiments, at least about 95%. In some embodiments, the transparent microspheres may transmit at least 50% of radiation at a selected wavelength (or range) in the near infrared spectrum (e.g. from 700 nm to about 1400 nm). In various embodiments, transparent microspheres may be made of e.g. inorganic glass, and/or may have a refractive index of e.g. from 1.7 to 2.0. (As noted earlier, in encapsulated-lens arrangements, the transparent microspheres may be chosen to have a higher refractive index as needed.) In various embodiments, the transparent microspheres may have an average diameter of at least 20, 30, 40, 50, 60, 70, or 80 microns. In further embodiments, the transparent microspheres may have an average diameter of at most 200, 180, 160, 140 120, 100, 80, or 60 microns. The vast majority (e.g. at least 90% by number) of the microspheres may be at least generally, substantially, or essentially spherical in shape. However, it will be understood that microspheres as produced in any real-life, large-scale process may comprise a small number of microspheres that exhibit slight deviations or irregularities in shape. Thus, the use of the term "microsphere" does not require that these items must be e.g. perfectly or exactly spherical in shape.

U.S. Patent Application Publication Nos. 2017/0276844 and 2017/0293056, which are incorporated by reference in their entirety herein, discuss methods of characterizing retroreflectivity according to e.g. a coefficient of retroreflectivity ($R_A$). In various embodiments, at least selected areas of retroreflective articles as disclosed herein may exhibit a coefficient of retroreflectivity, measured (at 0.2 degrees observation angle and 5 degrees entrance angle) in accordance with the procedures outlined in these Publications, of at least 50, 100, 200, 250, 350, or 450 candela per lux per square meter. In some embodiments, the $R_A$ may be highest when measured with a "head-on" entrance angle (e.g. 5 degrees). In other embodiments, the $R_A$ may be highest when measured with a "glancing" entrance angle (e.g. 50 degrees, or even 88.76 degrees).

In various embodiments, retroreflective articles as disclosed herein may meet the requirements of ANSI/ISEA 107-2015 and/or ISO 20471:2013. In many embodiments, retroreflective articles as disclosed herein may exhibit satisfactory, or excellent, wash durability. Such wash durability may be manifested as high $R_A$ retention (a ratio between $R_A$ after wash and $R_A$ before wash) after numerous (e.g. 25) wash cycles conducted according to the method of ISO 6330 2A, as outlined in U.S. Patent Application Publication No. 2017/0276844. In various embodiments, a retroreflective article as disclosed herein may exhibit a percent of $R_A$ retention of at least 30%, 50%, or 75% after 25 such wash cycles. In various embodiments, a retroreflective article as disclosed herein may exhibit any of these retroreflectivity-retention properties in combination with an initial $R_A$ (before washing) of at least 100 or 330 candela per lux per square meter, measured as noted above.

A retroreflective article as disclosed herein may be used for any desired purpose. In some embodiments, a retroreflective article as disclosed herein may be configured for use in or with a system that performs e.g. machine vision, remote sensing, surveillance, or the like. Such a machine vision system may rely on, for example, one or more visible and/or near-infrared (IR) image acquisition systems (e.g. cameras) and/or radiation or illumination sources, along with any other hardware and software needed to operate the system. Thus in some embodiments, a retroreflective article as disclosed herein (whether or not it is mounted on a substrate) may be a component of, or work in concert with, a machine vision system of any desired type and configuration. Such a retroreflective article may, for example, be configured to be optically interrogated (whether by a visual-wavelength or near-infrared camera, e.g. at a distance of up to several meters, or even up to several hundred meters) regardless of the ambient light conditions. Thus in various embodiments, such a retroreflective article may comprise retroreflective elements configured to collectively exhibit any suitable image(s), code(s), pattern, or the like, that allow information borne by the article to be retrieved by a machine vision system. Exemplary machine vision systems, ways in which retroreflective articles can be configured for use in such systems, and ways in which retroreflective articles can be characterized with specific regard to their suitability for such systems, are disclosed in U.S. Provisional Patent Application No. 62/536,654, which is incorporated by reference in its entirety herein.

In some embodiments, embedded reflective layers 30, color layers 40, and/or a cover layer (e.g. in the particular embodiment which an article is an encapsulated-lens retroreflective article) may be provided in various macroscopic areas of a retroreflective article rather than collectively occupying the entirety of the article. Such arrangements can allow images to be visible in retroreflected light (whether such images stand out by way of increased retroreflectivity and/or by way of an enhanced color). In some embodiments, such images may be achieved e.g. by performing patterned deposition of locally-laminated reflective layers e.g. by the use of a patterned laminating roll or a patterned conformable substrate in the lamination process. As noted earlier herein, in various embodiments a retroreflective article as disclosed herein may be configured to exhibit images when viewed in retroreflected light, to exhibit images when viewed in ambient light, or both. If both are present, the images when viewed in ambient light may be generally the same as those when viewed in retroreflected light (e.g. an article may convey the same information under both conditions); or the images may be different (e.g. so that different information is conveyed in ambient light versus in retroreflected light).

Various components of retroreflective articles (e.g. transparent microspheres, binder layers, reflective layers, etc.), methods of making such components and of incorporating such components into retroreflective articles in various arrangements, are described e.g. in U.S. Patent Application Publication Nos. 2017/0131444, 2017/0276844, and 2017/0293056, and in U.S. Provisional Patent Application No. 62/578,343, all of which are incorporated by reference in their entirety herein.

It will be appreciated that retroreflective elements comprising locally-laminated reflective layers as disclosed herein, can be used in any retroreflective article of any suitable design and for any suitable application. In particular, it is noted that the requirement of the presence of retroreflective elements comprising transparent microspheres (along with one or more color layers, reflective layers, etc.) does not preclude the presence, somewhere in the article, of other retroreflective elements (e.g. so-called cube-corner retroreflectors) that do not comprise transparent microspheres.

Although discussions herein have mainly concerned use of the herein-described retroreflective articles with garments and like items, it will be appreciated that these retroreflective articles can find use in any application, as mounted to, or present on or near, any suitable item or entity. Thus, for example, retroreflective articles as disclosed herein may find use in pavement marking tapes, road signage, vehicle marking or identification (e.g. license plates), or, in general, in reflective sheeting of any sort. In various embodiments, such articles and sheeting comprising such articles may present information (e.g. indicia), may provide an aesthetic appearance, or may serve a combination of both such purposes.

LIST OF EXEMPLARY EMBODIMENTS

Embodiment 1 is a retroreflective article comprising: a binder layer; and, a plurality of retroreflective elements spaced over a length and breadth of a front side of the binder layer, each retroreflective element comprising a transparent microsphere partially embedded in the binder layer so as to exhibit an embedded surface area of the transparent microsphere; wherein the article is configured so that at least some of the retroreflective elements each comprise a reflective layer that is a locally-laminated reflective layer that is embedded between the transparent microsphere and the binder layer.

Embodiment 2 is the retroreflective article of embodiment 1 wherein the article is configured so that at least 50 percent of the retroreflective elements of the retroreflective article comprise reflective layers that are locally-laminated, embedded reflective layers.

Embodiment 3 is the retroreflective article of any of embodiments 1-2 wherein the article is configured so that at least some of the locally-laminated, embedded reflective layers are localized reflective layers.

Embodiment 4 is the retroreflective article of any of embodiments 1-3 wherein the article is configured so that at least 50 percent of the locally-laminated, embedded reflective layers of the retroreflective article are localized reflective layers.

Embodiment 5 is the retroreflective article of any of embodiments 1-4 wherein the article is configured so that at least some of the locally-laminated, embedded reflective layers are bridging reflective layers that bridge at least two transparent microspheres.

Embodiment 6 is the retroreflective article of embodiment 5 wherein the article is configured so that at most 50 percent of the locally-laminated, embedded reflective layers are bridging reflective layers that bridge at least two transparent microspheres.

Embodiment 7 is the retroreflective article of any of embodiments 1-6 wherein the article is configured to comprise at least some transparent microspheres that do not comprise reflective layers disposed thereon, and wherein the transparent microspheres that comprise locally-laminated, embedded reflective layers make up from at least 10 percent to at most 95 percent of the total number of transparent microspheres of the retroreflective article.

Embodiment 8 is the retroreflective article of any of embodiments 1-7 wherein at least some of the locally-laminated, embedded reflective layers comprise a selective-bonding layer.

Embodiment 9 is the retroreflective article of any of embodiments 1-8 wherein at least some of the locally-laminated, embedded reflective layers comprise an embrittlement layer.

Embodiment 10 is the retroreflective article of any of embodiments 1-9 wherein the article is configured so that the locally-laminated, embedded reflective layers each occupy an angular arc of at most 180 degrees.

Embodiment 11 is the retroreflective article of any of embodiments 1-10 wherein at least some of the retroreflective elements comprise an intervening layer at least a portion of which is disposed between the transparent microsphere and the binder layer so that a locally-laminated, embedded reflective layer is positioned between the intervening layer and the binder layer.

Embodiment 12 is the retroreflective article of any of embodiments 1-11 wherein the binder layer comprises a colorant.

Embodiment 13 is the retroreflective article of any of embodiments 1-12 wherein at least some of the retroreflective elements comprise a localized color layer that is embedded between the transparent microsphere and the locally-laminated, embedded reflective layer.

Embodiment 14 is the retroreflective article of any of embodiments 1-13 wherein at least some of the locally-laminated, embedded reflective layers comprise a metal reflecting layer.

Embodiment 15 is the retroreflective article of any of embodiments 1-14 wherein at least some of the locally-laminated, embedded reflective layers comprise a reflecting layer that is a dielectric reflective layer comprising alternating high and low refractive index sublayers.

Embodiment 16 is the retroreflective article of any of embodiments 1-15 wherein the article exhibits an initial coefficient of retroreflectivity ($R_A$, measured at 0.2 degrees observation angle and 5 degrees entrance angle), in the absence of being exposed to a wash cycle, of at least 100 candela per lux per square meter.

Embodiment 17 is the retroreflective article of any of embodiments 1-16 wherein the article exhibits a coefficient of retroreflectivity ($R_A$, measured at 0.2 degrees observation angle and 5 degrees entrance angle) after 25 wash cycles, that is at least 30% of an initial coefficient of retroreflectivity in the absence of being exposed to a wash cycle.

Embodiment 18 is the retroreflective article of any of embodiments 1-17 wherein the article is configured so that at least 80 percent of the retroreflective elements of the retroreflective article comprise reflective layers that are locally-laminated, embedded reflective layers.

Embodiment 19 is the retroreflective article of any of embodiments 1-18 wherein the article is configured so that at least 80 percent of the locally-laminated, embedded reflective layers of the retroreflective article are localized reflective layers.

Embodiment 20 is the retroreflective article of any of embodiments 1-19 wherein the article is configured so that at least 5 percent of the locally-laminated, embedded reflective layers are bridging reflective layers that bridge at least two transparent microspheres.

Embodiment 21 is the retroreflective article of any of embodiments 1-20 wherein the article is configured to comprise at least some transparent microspheres that do not comprise reflective layers disposed thereon, and wherein the transparent microspheres that comprise locally-laminated, embedded reflective layers make up from at least 10 percent to at most 80 percent of the total number of transparent microspheres of the retroreflective article.

Embodiment 22 is the retroreflective article of any of embodiments 1-20 wherein the article is configured to comprise at least some transparent microspheres that do not comprise reflective layers disposed thereon, and wherein the transparent microspheres that comprise locally-laminated, embedded reflective layers make up from at least 10 percent to at most 60 percent of the total number of transparent microspheres of the retroreflective article.

Embodiment 23 is the retroreflective article of any of embodiments 1-22 wherein the article is configured so that at least some of the locally-laminated, embedded reflective layers each occupy an angular arc of at most 100 degrees.

Embodiment 24 is the retroreflective article of any of embodiments 1-22 wherein the article is configured so that at least some of the locally-laminated, embedded reflective layers each occupy an angular arc of at most 60 degrees.

Embodiment 25 is the retroreflective article of any of embodiments 1-24 wherein the binder layer comprises from 0.2 wt. % to 7.5 wt. % reflective particles.

Embodiment 26 is the retroreflective article of embodiment 25 wherein at least 50 wt. % of the reflective particles of the binder layer are nacreous reflective particles.

Embodiment 27 is the retroreflective article of any of embodiments 1-26 wherein the locally-laminated, embedded reflective layers are nonuniform reflective layers configured so that the percent area coverage of embedded surface areas of transparent microspheres by the locally-laminated, embedded reflective layers exhibits a coefficient of variation greater than 0.05.

Embodiment 28 is the retroreflective article of any of embodiments 1-26 wherein the locally-laminated, embedded reflective layers are nonuniform reflective layers configured so that the percent area coverage of embedded surface areas of transparent microspheres by the locally-laminated, embedded reflective layers exhibits a coefficient of variation greater than 0.10.

Embodiment 29 is the retroreflective article of any of embodiments 1-26 wherein the locally-laminated, embedded reflective layers are nonuniform reflective layers configured so that the percent area coverage of embedded surface areas of transparent microspheres by the locally-laminated, embedded reflective layers exhibits a coefficient of variation greater than 0.20.

Embodiment 30 is a transfer article comprising the retroreflective article of any of embodiments 1-29 and a disposable carrier layer on which the retroreflective article is detachably disposed with at least some of the transparent microspheres in contact with the disposable carrier layer.

Embodiment 31 is a substrate comprising the retroreflective article of any of embodiments 1-29, wherein the binder layer of the retroreflective article is coupled to the substrate with at least some of the retroreflective elements of the retroreflective article facing away from the substrate. Embodiment 32 is the substrate of embodiment 31 wherein the substrate is a fabric of a garment. Embodiment 33 is the substrate of embodiment 31 wherein the substrate is a support layer that supports the retroreflective article and that is configured to be coupled to a fabric of a garment.

Embodiment 34 is an intermediate article comprising: a disposable carrier layer with a major surface; a plurality of transparent microspheres partially embedded in the disposable carrier layer so that the transparent microspheres exhibit protruding surface areas; and wherein at least some of the transparent microspheres each comprise a locally-laminated, isolated reflective layer that is present on a portion of the protruding surface area of the transparent microsphere.

Embodiment 35 is the intermediate article of embodiment 34 wherein at least some of the transparent microspheres further comprise at least one intervening layer, at least a portion of which is disposed between the transparent microsphere and the locally-laminated, isolated reflective layer.

Embodiment 36 is the intermediate article of any of embodiments 34-35 wherein the locally-laminated, isolated reflective layers of the intermediate article are nonuniform reflective layers configured so that the percent area coverage of protruding surface areas of transparent microspheres by the locally-laminated, isolated reflective layers exhibits a coefficient of variation greater than 0.05. Embodiment 37 is the intermediate article of any of embodiments 34-35 wherein the locally-laminated, isolated reflective layers of the intermediate article are nonuniform reflective layers configured so that the percent area coverage of protruding surface areas of transparent microspheres by the locally-laminated, isolated reflective layers exhibits a coefficient of variation greater than 0.10.

Embodiment 38 is a method of making a retroreflective article by local lamination, the method comprising: bringing areas of a pre-made reflective layer into contact with portions of protruding areas of at least some transparent microspheres that are borne by a carrier layer and that are partially embedded therein; physically transferring the areas of the pre-made reflective layer to the portions of the protruding areas of the transparent microspheres with which the areas of the pre-made reflective layer are in contact, so that the transferred areas of the pre-made reflective layer are bonded to the portions of the protruding areas of the transparent microspheres; wherein during the physically transferring process the physically transferred areas of the pre-made reflective layer are detached from regions of the pre-made reflective layer that previously laterally surrounded the physically transferred areas; then, disposing a binder precursor on the carrier layer and on the protruding areas of the transparent microspheres; and, solidifying the binder precursor to form a retroreflective article comprising a binder layer and in which the physically transferred areas of the pre-made reflective layer are embedded between the transparent microspheres and the binder layer.

Embodiment 39 is the method of embodiment 38 wherein the bringing areas of a pre-made reflective layer into contact with portions of protruding areas of at least some transparent microspheres, physically transferring the areas of the pre-made reflective layer to the portions of the protruding areas of the transparent microspheres with which the areas are in contact, and bonding of the transferred areas of the pre-made reflective layer to the portions of the protruding areas of the transparent microspheres, is performed by bringing the areas of the pre-made reflective layer into contact with bonding layers that are present on the protruding areas of the transparent microspheres, wherein the bonding layers serve to bond the transferred areas to the portions of the protruding areas of the microspheres.

Embodiment 40 is the method of embodiment 38 wherein the pre-made reflective layer is a layer of a multilayer transfer stack and wherein during the physically transferring process the physically transferred areas of the pre-made reflective layer are delaminated from at least one other layer of the multilayer transfer stack, at a release interface.

Embodiment 41 is the method of embodiment 38 wherein the pre-made reflective layer is a layer of a multilayer transfer stack that includes a conformal substrate and wherein during the physically transferring process the physically transferred areas of the pre-made reflective layer are delaminated from the conformal substrate.

Embodiment 42 is a method of making an intermediate article comprising a plurality of transparent microspheres at least some of which comprise a locally-laminated, isolated reflective layer, the method comprising: bringing areas of a pre-made reflective layer into contact with portions of protruding areas of at least some transparent microspheres that are borne by a carrier layer and that are partially embedded therein; physically transferring the areas of the pre-made reflective layer to the portions of the protruding areas of the transparent microspheres with which the areas of the pre-made reflective layer are in contact, so that the transferred areas of the pre-made reflective layer are bonded to the portions of the protruding areas of the transparent microspheres; wherein during the physically transferring process the physically transferred areas of the pre-made reflective layer are detached from regions of the pre-made reflective layer that previously laterally surrounded the physically transferred areas.

Embodiment 43 is a retroreflective article of any of embodiments 1-29, made by the method of any of embodiments 38-42.

EXAMPLES

Materials

| Designation | Description |
| --- | --- |
| Resin 1 | A co-polyester solution under the trade designation VITEL ™ 3580 from Bostik Company (Wauwatosa, WI). |
| Resin 2 | A co-polyester solution under the trade designation VITEL ™ VPE-5833 from Bostik Company (Wauwatosa, WI). |
| SILANE-1 | A gamma-isocyanatopropyltriethoxysilane under the trade name SILQUEST A-1310 OR A-LINK 25, available from Momentive Performance Materials Inc., Albany, NY. |
| ICN 1 | A liquid aromatic polyisocyanide polymer based on toluene diisocyanate, under the trade designation DESMODUR L-75 from Covelco, Pittsburgh, PA. |
| Pigment 1 | A fluorescent lime-yellow pigment powder under the trade designation GT-17 SATURN YELLOW from Day Glo Color Corporation, Cleveland, Ohio. |
| CAT 1 | A liquid catalyst based on Dibutyltin dilaurate under the trade designation DABCO ™ T-12 from Evonik GmbH, Essen, Germany. |
| MEK | Methyl ethyl ketone (reagent grade) |
| MIBK | Methyl isobutyl ketone (reagent grade) |
| Acrylate-1 | An acrylate liquid based on tricyclodecane dimethanol diacrylate, under the trade name of SARTOMER SR833S from Sartomer USA (Exton, PA) |
| Heatseal Film -1 | An aluminized biaxially-oriented polypropylene film under the trade name TorayFAN PMX2 commercially available from Toray Plastics (America), Inc. (North Kingstown, RI) |
| Resin 3 | A linear, triblock copolymer based on styrene and isoprene with a polystyrene content of 19% under the trade name Kraton D1114 commercially available from Kraton Corporation (Houston, TX) |
| Resin 4 | A polyolefin plastomer resin under the trade name Affinity 1850 from The Dow Chemical Company (Midland, MI) |
| Silane 2 | A butylaminopropyltrimethoxysilane under the trade name Dynasylan 1189 commercially available from Evonik Industries (Essen, Germany) |
| Resin 5 | An acidic acrylate oligomer under the trade name of SARTOMER CN147 from Sartomer USA (Exton, PA) |
| Pigment 2 | A titanium dioxide based pigment under the trade name Dupont Ti-Pure R706 available from The Chemours Company (Wilmington, DE) |
| Pigment 3 | A black pigment under the trade name Orasol Black X51, Florham Park, NJ |

Test Methods

Retroreflectivity Measurement

Articles were evaluated for retroreflectivity performance by measuring the coefficient of retroreflectivity using a RoadVista 933 retroreflectometer (RoadVista, San Diego, CA).

The coefficient of retroreflectivity ($R_A$) is described in U.S. Pat. No. 3,700,305:

$$R_A = E_1 * d^2 / E_2 * A$$

$R_A$=retroreflective intensity
$E_1$=illumination incident upon the receiver
$E_2$=illumination incident upon a plane perpendicular to the incident ray of the specimen position, measured in the same units as $E_1$
d=distance from the specimen to the projector
A=area of the test surface The retroreflectivity measurement test procedure followed the test criteria described in ASTM E8 10-03 (2013)—Standard Test Method for Coefficient of Retroreflective Sheeting using the Coplanar Geometry. Retroreflective units are reported in cd/lux/m². High visibility safety apparel standards such as ANSI/ISEA 107-2010 and ISO 20471:2013 require minimum retroreflective coefficient performance at specific combinations of entrance and observation angle. Entrance angle is defined as the angle between the illumination axis and the retroreflector axis. The observation angle is defined as the angle between the illumination axis and the observation axis. Unless otherwise stated, the entrance angle was 5 degrees, and the observation angle was 0.2 degrees. In some cases, samples were evaluated in a "32-angle" test battery of the type described in Table 5 of ISO 20471:2013 and often used in the evaluation of e.g. safety apparel. In such testing, the observation angle, the entrance angle, and the orientation of the sample (0 or 90 degrees) is varied. It will be understood, however, that not all uses will necessarily require a retroreflective article to meet this particular standard.

Color Measurement

The color of a retroreflective article can be described in terms of a luminance-chromaticity color space (Yxy), where Y is the color luminance, and x and y are chromaticity coordinates. These values are related to the CIE XYZ color space (International Commission on Illumination (CIE 1931)):

$$x = X/(X+Y+Z)$$

$$y = Y/(X+Y+Z)$$

The advantage of using Yxy color space is that the chromaticity can be plotted on a chart, usually called the CIE x-y chromaticity diagram. This color representation/nomenclature is used in high visibility safety apparel regulatory standards such as ANSI/ISEA 107-2010 and ISO 20471:2013. The color measurement procedure is in accordance with the procedure outlined in ASTM E 308-90, where the following operating parameters are as set forth below:

Standard illuminant: D65 daylight illuminant
Standard observer: CIE (International Commissioner of Illumination) 1931 2°
Wavelength interval: 400-700 nanometers at 10 nanometer intervals
Incident light: 0° on sample plane
Viewing: 45° through a ring of 16 fiber optic receptor stations
Area of view: one inch
Port size: one inch In certain examples, an alternate color representation (L*a*b*) is used. The definition of this color space is described as CIE L*a*b* 1976 color space. Knowing these parameters, a person of ordinary skill can reproduce this test. For a further discussion of the operating parameters see ASTM E 1164-93.

Peel Force
90 Degree Peel Method

Peel force was measured using a T-Peel test according to ASTM D1876-08. Samples measuring 2 inches by 6 inches (50×150 mm) were cut from sheets of coated film and laid coated side up on a smooth clean surface. A piece of Scotch® 3850 Shipping Packaging Tape (3M Corporation, St. Paul, MN) was cut measuring about 8 inches (200 mm) long, aligned with the long edge of the sample, and applied to the coated side of the sample with a hard rubber hand roller using firm pressure. Care was taken to avoid the formation of creases or any entrapped air. A 1 inch (25 mm) wide test strip was slit out of the center of the laminated sample, in the long dimension, ensuring the two edge cuts were clean and parallel. The first one-quarter to one-half inch of the laminated test strip was separated and the two separated ends were secured in the grips of a tensile tester which was configured to conduct testing in a T-Peel geometry at a peel rate of 3 inches/minute (75 mm per minute) and record the peel force in grams. The peel was initiated and allowed to continue until at least 4 inches of the test strip length had been separated. The separated surfaces of the test strip were examined to determine location of failure and the peel value was recorded in grams per linear inch.

180 Degree Peel Method

Same sample preparation as for the 90 degree peel method, except the test was constructed in a 180 degree peel geometry with a 2 inch (50 nm) wide test strip.

Method for Making Temporary Bead Carrier Containing Glass Microspheres

In each of the Examples and Comparative Examples, glass microspheres were partially and temporarily embedded in a carrier sheet. The carrier sheet included paper juxtaposed against a polyethylene layer that was about 25 to 50 micrometers thick. The carrier sheet was heated in a convection oven to 220° F. (104° C.), then the microspheres were poured onto polyethylene side of the sheet and left for 60 seconds. The sheet was removed from the oven and allowed to cool to room temperature. Excess beads were poured off the sheet, and the sheet was then placed in an oven at 320° F. (160° C.) for 60 seconds. The sheet was removed from the oven and allowed to cool. The microspheres were partially embedded in the polyethylene layer such that more than 50 percent of the microspheres protruded.

Working Example 2.3

Example 2.3 describes the use of local lamination methods to produce retroreflective articles comprising embedded reflective layers. This Example uses a conformal (elastomeric) substrate (referred to in the Example as an elastomeric transfer adhesive) to assist in the local lamination. (This and other Examples herein preserve the nomenclature and ordering in which these Examples were presented in U.S. Provisional Patent Application 62/578,343.)

The following examples describe five general parts:
A. Making an article that has a multi-layer transferrable reflector layer
B. Making an elastomeric transfer adhesive
C. Transferring the reflector layer from (A) to (B)
D. Transferring the reflector layer from (C) to a bead carrier
E. Making a retroreflective article from (D)

Example 2.3.1

2.3.1.A (Part A)

Optical films were made on a vacuum coater similar to the coater described in U.S. Pat. No. 8,658,248 (Anderson et al.) and U.S. Pat. No. 7,018,713 (Padiyath, et al.). This coater was threaded up with a substrate in the form of an indefinite length roll of 980 microinch (0.0250 mm) thick, 14 inch (35.6 cm) wide Heatseal Film-1. This substrate was then advanced at a constant line speed of 32 fpm (9.8 m/min).

A first organic layer was formed on the substrate by applying Acrylate-1, by ultrasonic atomization and flash evaporation to make a coating width of 12.5 inches (31.8 cm). This monomeric coating was subsequently cured immediately downstream with an electron beam curing gun operating at 7.0 kV and 10.0 mA. The flow of liquid monomer into the evaporator was 0.67 ml/min, the nitrogen gas flow rate was 100 sccm and the evaporator temperature was set at 500° F. (260° C.). The process drum temperature was 14° F. (−10° C.).

On top of this first organic layer, a silver reflecting layer was deposited by DC sputtering of a >99% silver cathode target. The system was operated at 3 kW with a 30 fpm (9.1 meters per minute) line speed. Two subsequent depositions with the same power and line-speed were done to create a 90 nm layer of silver.

On top of this silver layer, an oxide layer of silicon aluminum oxide was deposited by AC reactive sputtering. The cathode had a Si(90%)/Al(10%) target obtained from Soleras Advanced Coatings US, of Biddeford, (ME). The voltage for the cathode during sputtering was controlled by a feed-back control loop that monitored the voltage and controlled the oxygen flow such that the voltage would remain high and not crash the target voltage. The system was operated at 16 kW of power to deposit a 12 nm thick layer of silicon aluminum oxide onto the silver reflecting layer. (Silicon aluminum oxide may be referred to herein as $SiAlO_x$ for convenience; this does not signify any particular stoichiometric ratio of any of the components.)

The aluminum surface of the Heatseal Film-1 film and the first organic layer would decouple with a 180 Peel force of 7.2 W/in (0.283 g per mm).

2.3.1.E (Part B) Making an Elastomeric Transfer Adhesive

Elastomeric transfer adhesive films containing one or more layers were made using traditional cast co-extrusion process as described in co-extrusion patents such as U.S.

Pat. Nos. 5,223,276, 9,327,441 and WO9936248, the disclosures of which are incorporated herein by reference thereto.

3-Layer Transfer Films:

A 3-layer feed block (ABA plug) in combination with a single layer manifold die (10-inch (254 mm) width) was used to generate 3-layer films with an elastomeric core and polyolefin plastomer skin. The elastomeric core was made using Resin 3 and the polymer plastomer skin using Resin 4. The core material was melted at 400° F. (204° C.) in a single screw extruder and fed into one of the inlets of the 3-layer feed block, while the skin material was melted at 360° F. (182° C.) in a twin-screw extruder and fed into a second inlet in the feed block where it split into two streams to encapsulate the core layer on both sides. The composite film was then cast directly from the die onto a chilled roll maintained at 60-70° F. (15-21° C.). The caliper and core-skin ratio was varied by adjusting the line speed of the winder unit and changing the configuration of the floating vanes in the feed block respectively. Multilayer films with thickness ranging from 0.002-0.005 inches (0.051-0.127 mm) and core-skin ratio ranging from 10-30 were produced and used for the transfer process.

2.3.1.0 (Part C)

The three-layer elastomer adhesive was laminated to the article described in Part A using an Akiles ProLam Plus 330 13" Pouch Laminator (Mira Loma, CA) with a setpoint of 171° F. (77° C.) with the SiAlO$_x$ surface in contact with the elastomer transfer adhesive surface. The Heatseal Film 1 was removed from the construction and discarded. The 180 Peel test showed that the multilayer film of acrylate/Ag/SiAlO$_x$ could be removed from the surface of the planar elastomer with peel forces of 25 g/in (0.98 g/mm).

2.3.1.D (Part D)

A solution containing 6.18 parts Resin 1, 0.13 parts SILANE-1, 0.5 parts ICN 1, and 33.41 parts MEK was mixed into a MAX 40 Speedmixer cup, and further mixed at 2400 rpm for 60 seconds in a DAC 150.1 FVZ-K Speedmixer (FlackTek Inc, Landrum, SC). The solution was coated onto the temporary bead carrier using a notch-bar coater gapped at 51 micrometers. The sample was dried for 3 minutes at 150° F. (65.5° C.) with an additional curing for 4 minutes at 200° F. (93.3° C.). This produced the Polymer Coated Bead Carrier.

The elastomeric transfer adhesive with the weakly bound acrylate/Ag/SiAlO$_x$ multilayer optical reflector film was pressed against the Polymer Coated Bead Carrier at 180° F. (82° C.) with a lamination force of 40 lb/in (714 g/mm) of lamination force. In this step, the acylate surface makes contact with the polymer surface of the polymer coated bead carrier. Then the elastomeric transfer adhesive was pulled away from the Polymer Coated Bead Carrier to produce the Transferred Bead Carrier-1.

2.3.1.E (Part E)

A solution consisting of 61 parts Resin 1, 11 parts Resin 2, 7 parts Pigment 1, 2 parts ICN-1, 1 part SILANE-1, 1 part 10% CAT-1 in MEK, 11 parts MEK and 7 parts MIBK was mixed into a MAX 40 Speedmixer cup, and further mixed at 2400 rpm for 60 seconds in a DAC 150.1 FVZ-K Speedmixer (FlackTek Inc, Landrum, SC). The solution was coated onto the Transferred Bead Carrier-1 using a laboratory notch bar coater with a 0.008 inch (0.2 millimeter) gap. The coated sample was dried for 30 seconds at 160° F. (71.1° C.), then dried for an additional 3 minutes at 180° F. (82.2° C.). The dried coating thus formed a binder layer of the general type described earlier herein, which binder layer included fluorescent yellow Pigment 1. The sample was then laminated onto a polyamide fabric using a roll laminator at 220° F. (104.4° C.) at a roller speed of approximately 32 inches per minute (0.8 meter per minute). Inventive Example 2-3-1 was obtained by removal of the bead carrier sheet, and was tested and found to exhibit $R_A$ (at EA/OA of 5/0.2) of 616, Y of 52.9, x of 0.3642, and y of 0.4795. Table 2.3.1 presents the results of a "32-angle" retroreflectivity test. Although not noted explicitly in the Table, each pair of observations (at identical observation angles and identical entrance angles) are for orientation angles of 0 and 90 degrees. The obtained results (the rightmost column of Table 2.3.1) are compared to the ANSI minimum specification.

Table for 2.3.1

| Observation Angle (degrees) | Entrance Angle (degrees) | ANSI/ISEA 107 Minimum Spec. | $R_A$ (cd/lx-m$^2$) |
| --- | --- | --- | --- |
| 0.2 | 5 | 330 | 609 |
| 0.2 | 5 | 330 | 616 |
| 0.2 | 20 | 290 | 467 |
| 0.2 | 20 | 290 | 525 |
| 0.2 | 30 | 180 | 349 |
| 0.2 | 30 | 180 | 408 |
| 0.2 | 40 | 65 | 264 |
| 0.2 | 40 | 65 | 324 |
| 0.33 | 5 | 250 | 373 |
| 0.33 | 5 | 250 | 379 |
| 0.33 | 20 | 200 | 292 |
| 0.33 | 20 | 200 | 327 |
| 0.33 | 30 | 170 | 228 |
| 0.33 | 30 | 170 | 258 |
| 0.33 | 40 | 60 | 190 |
| 0.33 | 40 | 60 | 217 |
| 1 | 5 | 25 | 52.1 |
| 1 | 5 | 25 | 51.7 |
| 1 | 20 | 15 | 39.9 |
| 1 | 20 | 15 | 45.2 |
| 1 | 30 | 12 | 31.5 |
| 1 | 30 | 12 | 36.9 |
| 1 | 40 | 10 | 23 |
| 1 | 40 | 10 | 28 |
| 1.5 | 5 | 10 | 15.9 |
| 1.5 | 5 | 10 | 16.4 |
| 1.5 | 20 | 7 | 13.7 |
| 1.5 | 20 | 7 | 14.9 |
| 1.5 | 30 | 5 | 11.4 |
| 1.5 | 30 | 5 | 12.8 |
| 1.5 | 40 | 4 | 10.7 |
| 1.5 | 40 | 4 | 10.2 |

Example 2.3.2

As in Example 2-3-1, Except:

In 2.3.2.B (Part B) a single layer elastomeric transfer adhesive was made in a 6-inch single manifold die using Resin 3. The raw material was melted in a single screw extruder at 400° F. (204° C.) and cast onto a chilled roll maintained at room temperature. Films with thicknesses ranging from 0.001-0.004 inches (0.025-0.1 mm) were produced by adjusting the line speed of the winder unit and used for the mirror transfer process. This material allowed the lamination of 2.3.2.0 and 2.3.2.D (Part C and D) to be done at 77° F. (25° C.) without additional heating. In 2.3.2.D (Part D) if less than 40 lb/in (714 g/mm) lamination force was used, less than full-transfer, or partial transfer, of the mirror was facilitated. This led to lower retroreflectivity ($R_A$=ranging from 20 to 400 cdlx-m$^2$) with the value dependent on the pressure used. Then the elastomeric transfer adhesive was pulled away from the Polymer Coated Bead Carrier to produce the Transferred Bead Carrier-2.

Example 2.3.3

2.3.3.A (Part A)

A transfer multilayer optical reflector was prepared as follows:

A transfer reflector film is described and was made on a roll to roll vacuum coater similar to the coater described in U.S. Patent Application No. 20100316852 (Condo, et al.) with the addition of a second evaporator and curing system located between the plasma pretreatment station and the first sputtering system, and using evaporators as described in U.S. Pat. No. 8,658,248 (Anderson and Ramos).

This coater was outfitted with a substrate in the form of a 1000 ft (305 m) length roll of 0.002 in (0.05 mm) thick, 14 inch (35.6 cm) wide polyethylene terephthalate (PET) film manufactured by 3M Company. The substrate was prepared for coating by subjecting it to a nitrogen plasma treatment to improve the adhesion of the metallic layer. The film was treated with a nitrogen plasma operating at 120 W using a titanium cathode, using a web speed of 32 fpm (9.8 meters/min) and maintaining the backside of the film in contact with a coating drum chilled to 14° F. (−10° C.).

On this prepared PET substrate, the release layer of SiAl was deposited in-line with the previous plasma treatment step. The cathode had a Si(90%)/Al(10%) target obtained from Soleras Advanced Coatings US, of Biddeford, (ME). A conventional AC sputtering process employing Ar gas and operated at 24 kW of power was used to deposit a 37 nm thick layer of SiAl alloy onto the substrate. The SiAl coated PET substrate was then rewound.

On this SiAl release layer, a layer of Acrylate-1 was deposited in-line on top of the SiAl layer. The acrylate layer was applied by ultrasonic atomization and flash evaporation to make a coating width of 12.5 inches (31.8 cm). The flow rate of this mixture into the atomizer was 0.33 ml/min to achieve a 94 nm layer, the gas flow rate was 60 standard cubic centimeters per minute (sccm), and the evaporator temperature was 500° F. (260° C.). Once condensed onto the SiAl layer, this monomeric coating was cured immediately with an electron beam curing gun operating at 7.0 kV and 10.0 mA.

On this acrylate layer, an inorganic oxide layer of niobium oxide was applied in a separate pass. The cathode ceramic or suboxide NbOx target obtained from Soleras Advanced Coatings US, of Biddeford, (ME) was used. More specifically, a conventional DC sputtering process operated at 2 kW of power was employed to deposit an approximately 66 nm thick layer of NbOx onto the substrate to form a quarter wave optical thickness at a line speed of 1 fpm (0.3 m/min) using a 450 sccm Ar and 14 sccm O2 gas flow.

On this niobium oxide layer, an acrylate layer was formed. This polymeric layer was produced by atomization and evaporation of a monomer mixture containing 94 parts Acrylate-1, 3 parts Silane-2), and 3 parts Resin-5 in a separate pass on top of the niobium oxide layer. The acrylate layer was applied by ultrasonic atomization and flash evaporation to make a coating width of 12.5 inches (31.8 cm). The flow rate of this mixture into the atomizer was 0.66 ml/min to achieve a 188 nm layer at 32 fpm (9.8 meters per minute), the gas flow rate was 60 standard cubic centimeters per minute (sccm), and the evaporator temperature was 500° F. (260° C.). Once condensed onto the niobium oxide layer, this monomeric coating was cured immediately with an electron beam curing gun operating at 7.0 kV and 10.0 mA.

2.3.3.0 (Part C)

The three-layer elastomer described in 2.3.1.B was laminated to the article described in 2.3.3.A (Part A) at 171° F. (77° C.) and then the SiAl coated PET was removed and discarded.

2.3.3.D (Part D)

The elastomeric transfer adhesive with the weakly bound acrylate/NbOx/Acrylate multilayer optical reflector film was pressed against the Polymer Coated Bead Carrier at 180° F. (82° C.) with a lamination force of 50 lb/in (893 g/mm). In this step, the acylate surface makes contact with the polymer surface of the polymer coated bead carrier. Then the elastomeric transfer adhesive was pulled away from the Polymer Coated Bead Carrier to produce the Transferred Bead Carrier-3.

2.3.3.E (Part E)

A solution consisting of 61 parts Resin 1, 11 parts Resin 2, 7 parts Pigment 1, 2 parts ICN-1, 1 part SILANE-1, 1 part 10% CAT-1 in MEK, 11 parts MEK and 7 parts MIBK was mixed into a MAX 40 Speedmixer cup, and further mixed at 2400 rpm for 60 seconds in a DAC 150.1 FVZ-K Speedmixer (FlackTek Inc, Landrum, SC). The solution was coated onto the Transferred Bead Carrier-3 using a laboratory notch bar coater with a 0.008 inch (0.2 millimeter) gap. The coated sample was dried for 30 seconds at 160° F. (71.1° C.), then dried for an additional 3 minutes at 180° F. (82.2° C.). The sample was then laminated onto a polyamide fabric using a roll laminator at 220° F. (104.4° C.) at a roller speed of approximately 32 inches per minute (0.8 meter per minute). Inventive Example 2-3-3 was obtained by removal of the bead carrier sheet. The article has an $R_A$ of 105, Y of 110, x of 0.3569, and y of 0.4805. It will be appreciated that this article comprised a reflecting layer in the form of a dielectric stack rather than a reflecting metal layer.

Working Example 2.4

Example 2.4 describes the use of local lamination methods to produce retroreflective articles comprising embedded reflective layers. This Example uses direct transfer (without the assistance of a conformal (elastomeric) substrate) lamination methods.

The following direct transfer examples describe three general parts:
A. Making an article that has a multi-layer transferrable reflector layer
B. Transferring the reflector layer from (A) directly to a bead coat
C. Making a retroreflective article from (B)

Example 2.4.1

2.4.1 Part A

A transfer mirror film is described in this Example and was made on a roll to roll vacuum coater similar to the coater described in U.S. Patent Application No. 20100316852 with the addition of a second evaporator and curing system located between the plasma pretreatment station and the first sputtering system, and using evaporators as described in U.S. Pat. No. 8,658,248.

This coater was threaded up with a substrate in the form of an indefinite length roll of 0.001 inch (0.0250 mm) thick, 14 inch (356 mm) wide Heatseal Film-1. The metal side of the film was coated using a web speed of 9.8 meters/min and maintaining the backside of the film in contact with a coating drum chilled to −10° C. A layer of Acrylate-1 was deposited in-line on top of the aluminum metalized side of the Heatseal Film-1. The acrylate layer was applied by ultrasonic atomization and flash evaporation to make a coating width of 12.5 inches (31.8 cm). The flow rate of this mixture into the atomizer was 0.67 ml/min to achieve a 188 nm layer, the gas flow rate was 60 standard cubic centimeters per minute (sccm), and the evaporator temperature was 260° C. Once condensed onto the Al layer, this monomeric coating was cured immediately with an electron beam curing gun operating at 7.0 kV and 10.0 mA.

On this acrylate layer, a reflecting layer of Ag was applied using a cathode Ag target (ACI Alloys of San Jose, CA). This Ag metal layer was deposited by a conventional DC sputtering process employing Ar gas, operated at 3 kW of power, and at a 9.8 meters/min line speed to per pass for 3 passes to deposit a 60 nm thick layer of Ag.

On this Ag reflecting layer, an inorganic oxide layer was applied. This oxide material was laid down by an AC reactive sputter deposition process employing a 40 kHz AC power supply. The cathode had a Si(90%)/Al(10%) rotary target obtained from Soleras Advanced Coatings US, of Biddeford, (ME). The voltage for the cathode during sputtering was controlled by a feed-back control loop that monitored the voltage and controlled the oxygen flow such that the voltage would remain high and not crash the target voltage. The system was operated at 16 kW of power and 32 fpm to deposit a 12 nm thick layer of silicon aluminum oxide onto the Ag layer.

2.4.1 Part B

The Heatseal Film-1 substrate with the weakly bound acrylate/Ag/SiAlO$_x$ multilayer optical reflector film was pressed against the Polymer Coated Bead Carrier at room temperature with 500 lb/linear inch (87.5 kN/m) of lamination force at 10 fpm (4.2 mm per second). The SiAlO$_x$ surface was in contact with the polymer coated side of the carrier. A silicone rubber sleeve with a 78D hardness backed the Heatseal Film-1 substrate and a steel roll backed the paper side of the Polymer Coated Bead Carrier. After lamination, the Heatseal Film-1 film was removed to produce the Transferred Bead Carrier-4.

2.4.1 Part C

A mixture consisting of 61 parts Resin 1, 11 parts Resin 2, 7 parts Pigment 1, 2 parts ICN-1, 1 part SILANE-1, 1 part 10% CAT-1 in MEK, 11 parts MEK and 7 parts MIBK was mixed into a MAX 40 Speedmixer cup, and further mixed at 2400 rpm for 60 seconds in a DAC 150.1 FVZ-K Speedmixer (FlackTek Inc, Landrum, SC). The solution was coated onto the Transferred Bead Carrier-4 using a laboratory notch bar coater with a 0.008 inch (0.2 millimeter) gap. The coated sample was dried for 30 seconds at 160° F. (71.1° C.), then dried for an additional 3 minutes at 180° F. (82.2° C.). The sample was then laminated onto a polyamide fabric using a roll laminator at 220° F. (104.4° C.) at a roller speed of approximately 32 inches per minute (0.8 meter per minute). Inventive Example 2-4-1 was obtained by removal of the bead carrier sheet, with R$_A$ of 386, Y of 98, x of 0.3531, and y of 0.4810.

Example 2.4.2

A solution consisting of 84 parts Resin 1, 8 parts Pigment 2, 4 parts ICN-1, 1 part SILANE-1, 1 part 10% CAT-1 in MEK was mixed into a MAX 40 Speedmixer cup, and further mixed at 2400 rpm for 60 seconds in a DAC 150.1 FVZ-K Speedmixer (FlackTek Inc, Landrum, SC). The solution was coated onto the Transferred Bead Carrier-4 using a laboratory notch bar coater with a 0.008 inch (0.2 mm) gap. The coated sample was dried for 30 seconds at 190° F. (87.8° C.), laminated to a polyester white fabric using a hand roller, then dried for an additional 6 minutes at 215° F. (101.7° C.). Inventive Example 2-4-2 was obtained by removal of the bead carrier sheet, and exhibited R$_A$ of 394, L* of 81.2, a* of −0.9, b* of 1.1.

Example 2.4.3

A solution consisting of 84 parts Resin 1, 4 parts Pigment 3, 4 parts ICN-1, 1 part SILANE-1, 1 part 10% CAT-1 in MEK was mixed into a MAX 40 Speedmixer cup, and further mixed at 2400 rpm for 60 seconds in a DAC 150.1 FVZ-K Speedmixer (FlackTek Inc, Landrum, SC). The solution was coated onto the Transferred Bead Carrier-4 using a laboratory notch bar coater with a 0.008 inch (0.2 mm) gap. The coated sample was dried for 30 seconds at 190° F. (87.8° C.), laminated to a polyester white fabric using a hand roller, then dried for an additional 6 minutes at 215° F. (101.7° C.). Inventive Example 2-4-3 was obtained by removal of the bead carrier sheet, with R$_A$ of 277, L* of 25.3, a* of 0.7, b* of −1.3.

Example 2.4.4

A solution consisting of 84 parts Resin 1, 4 parts ICN-1, 1 part SILANE-1, 1 part 10% CAT-1 in MEK was mixed into a MAX 40 Speedmixer cup, and further mixed at 2400 rpm for 60 seconds in a DAC 150.1 FVZ-K Speedmixer (FlackTek Inc, Landrum, SC). The solution was coated onto the Transferred Bead Carrier-4 using a laboratory notch bar coater with a 0.008 inch (0.2 mm) gap. The coated sample was dried for 30 seconds at 190° F. (87.8° C.), and an additional 6 minutes at 215° F. (101.7° C.). The coating side of the sample was marked with a colorful graphic image using a permanent ink marker, and then laminated to a white cotton fabric using a hot melt adhesive. Inventive Example 2-4-4 was obtained by removal of the bead carrier sheet, and exhibited R$_A$ of 385. The colorful graphic image was clearly visible on the marked region of Example 2-4-4. Example 2-4-4 had L* of 74.5, a* of 1.0, b* of −5.9 on the unmarked region.

Example 2.4.5

2.4.5 Part A

A transfer mirror film is described in this Example and was made on a roll to roll vacuum coater similar to the coater described in U.S. Patent Application No. 20100316852 (Condo, et al.) with the addition of a second evaporator and curing system located between the plasma pretreatment station and the first sputtering system, and using evaporators as described in U.S. Pat. No. 8,658,248 (Anderson and Ramos).

This coater was threaded up with a substrate in the form of an indefinite length roll of 0.001 inch (0.0250 mm) thick, 14 inch (35.6 cm) wide Heatseal Film-1. The metal side of the film was coated using a web speed of 9.8 meters/min and maintaining the backside of the film in contact with a coating drum chilled to 14° F. (−10° C.).

Acrylate-1 was then deposited on top of the aluminum coating of Heatseal Film-1. The acrylate layer was applied using ultrasonic atomization and flash evaporation to make a coating width of 12.5 inches (31.8 cm). The flow rate of this mixture into the atomizer was 0.67 ml/min to achieve a 188 nm layer, the gas flow rate was 60 standard cubic centimeters per minute (sccm), and the evaporator temperature was 260° C. Once condensed onto the Al layer, this monomeric coating was cured immediately with an electron beam curing gun operating at 7.0 kV and 10.0 mA.

On this acrylate layer, a reflecting layer of Ag was applied using a cathode Ag target that was obtained from ACI Alloys of San Jose, CA This Ag metal layer was deposited by a conventional DC sputtering process employing Ar gas, operated at 3 kW of power, and at a 9.8 meters/min line speed to per pass for 3 passes deposit a 60 nm thick layer of Ag. This layer showed signs of corrosion if exposed to normal laboratory ambient conditions after one week.

2.4.5 Part B/C

Parts B and C for Inventive Example 2.4.5 used procedures previously described for Inventive Example 2.4.1, except for Part B, the transfer was conducted using a line speed of 3 fpm (0.91 m per minute). Inventive Example 2-4-5 exhibited $R_A$ of 368, Y of 101, x of 0.3916 and a y of 0.5389.

The foregoing Examples have been provided for clarity of understanding only, and no unnecessary limitations are to be understood therefrom. The tests and test results described in the Examples are intended to be illustrative rather than predictive, and variations in the testing procedure can be expected to yield different results. All quantitative values in the Examples are understood to be approximate in view of the commonly known tolerances involved in the procedures used.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter. To the extent that there is any conflict or discrepancy between this specification as written and the disclosure in any document that is incorporated by reference herein, this specification as written will control.

This application is a continuation of U.S. patent application Ser. No. 15/733,033 (published as U.S. Patent Application Publication No. US2020/0264350, and now allowed), which was a national stage filing under 35 U.S.C. 371 of PCT Application No. PCT/US2018/057553 (published as International Publication No. WO2019/084295), which claimed priority to U.S. Provisional Applications Nos. 62/578,343 and 62/739,506, the disclosures of all of which are incorporated by reference in their entirety herein.

What is claimed is:

1. A method of making an intermediate article comprising a plurality of transparent microspheres at least some of which comprise a locally-laminated, isolated reflective layer, the method comprising:
    bringing areas of a pre-made reflective layer into contact with portions of protruding areas of at least some transparent microspheres that are borne by a carrier layer and that are partially embedded therein;
    physically transferring the areas of the pre-made reflective layer to the portions of the protruding areas of the transparent microspheres with which the areas of the pre-made reflective layer are in contact, so that the transferred areas of the pre-made reflective layer are bonded to the portions of the protruding areas of the transparent microspheres;
    wherein during the physically transferring process, the physically transferred areas of the pre-made reflective layer are detached from regions of the pre-made reflective layer that previously laterally surrounded the physically transferred areas, with the regions of the pre-made reflective layer that previously laterally surrounded the physically transferred areas not being transferred and not being present in the intermediate article.

2. The method of claim 1 wherein the bringing areas of a pre-made reflective layer into contact with portions of protruding areas of at least some transparent microspheres, physically transferring the areas of the pre-made reflective layer to the portions of the protruding areas of the transparent microspheres with which the areas are in contact, and bonding of the transferred areas of the pre-made reflective layer to the portions of the protruding areas of the transparent microspheres, is performed by bringing the areas of the pre-made reflective layer into contact with bonding layers that are present on the protruding areas of the transparent microspheres, wherein the bonding layers serve to bond the transferred areas to the portions of the protruding areas of the microspheres.

3. The method of claim 2 wherein the bonding layers are discontinuous transparent layers of organic polymeric material that are disposed atop the protruding areas of the microspheres.

4. The method of claim 1 wherein the pre-made reflective layer is a layer of a multilayer transfer stack and wherein during the physically transferring process the physically transferred areas of the pre-made reflective layer are delaminated from at least one other layer of the multilayer transfer stack at a release interface.

5. The method of claim 4 wherein the multilayer transfer stack comprises the pre-made reflective layer along with a releasable support assembly, with the pre-made reflective layer comprising an embrittlement layer, a reflecting layer, and a selective-bonding layer; and, with the releasable support assembly comprising a support substrate and a release layer, with a major surface of the release layer being in contact with a major surface of the selective-bonding layer to provide the release interface.

6. The method of claim 5 wherein the bringing of the areas of the pre-made reflective layer into contact with the bonding layers that are present on the protruding areas of the transparent microspheres comprises bringing areas of the embrittlement layer of the pre-made reflective layer into contact with the bonding layers, so that the areas of the embrittlement layer are bonded to the bonding layers.

7. The method of claim 6 wherein the delaminating of the physically transferred areas of the pre-made reflective layer from the at least one other layer of the multilayer transfer stack at a release interface, comprises delaminating of areas of the selective-bonding layer of the pre-made reflective layer from the major surface of the release layer of the releasable support assembly, so that the releasable support assembly is detached from the pre-made reflective layer so as to not be present in the intermediate article.

8. The method of claim 7 wherein the embrittlement layer is a metal oxide layer and wherein in the intermediate article, all embrittlement layers are located between the transparent microspheres and the reflecting layers of the reflective layers; and, wherein the selective-release layer is a layer of organic polymeric material and wherein in the intermediate article, all selective-release layers are located on opposite sides of the reflecting layers from the embrittlement layers.

9. The method of claim 1 wherein the pre-made reflective layer is a layer of a multilayer transfer stack that includes a conformal substrate and wherein during the physically transferring process the physically transferred areas of the pre-made reflective layer are delaminated from the conformal substrate at a release interface.

10. The method of claim 9 wherein the pre-made reflective layer comprises an embrittlement layer, a reflecting layer, and a selective-bonding layer, with a major surface of the embrittlement layer being in contact with a major surface of the conformal substrate to provide the release interface.

11. The method of claim 10 wherein the bringing of the areas of the pre-made reflective layer into contact with the bonding layers that are present on the protruding areas of the transparent microspheres comprises bringing areas of the selective-bonding layer of the pre-made reflective layer into contact with the bonding layers, so that the areas of the selective-bonding layer are bonded to the bonding layers.

12. The method of claim 11 wherein the delaminating of the physically transferred areas of the pre-made reflective layer from the at least one other layer of the multilayer transfer stack at a release interface, comprises delaminating of areas of the embrittlement layer of the pre-made reflective layer from the major surface of the conformal substrate, so that the conformal substrate is detached from the pre-made reflective layer so as to not be present in the intermediate article.

13. The method of claim 11 wherein the selective-bonding layer is a layer of organic polymeric material and wherein in the intermediate article, all selective-bonding layers are located between the transparent microspheres and the reflecting layers of the reflective layers; and, wherein the embrittlement layer is a metal oxide layer and wherein in the intermediate article, all embrittlement layers are located on opposite sides of the reflecting layers from the selective-bonding layers.

14. The method of claim 1 wherein the pre-made reflective layer comprises a metal reflecting layer, so that the locally-laminated, isolated reflective layers of the intermediate article each comprise a metal reflecting layer.

15. The method of claim 1 wherein the pre-made reflective layer is a layer of a multilayer transfer stack and wherein the method is performed by bringing the transparent microspheres that are borne by the carrier layer, and the multilayer transfer stack, together in a lamination nip between first and second backing rolls.

16. A method of making a retroreflective article by local lamination, the method comprising:
  bringing areas of a pre-made reflective layer into contact with portions of protruding areas of at least some transparent microspheres that are borne by a carrier layer and that are partially embedded therein;
  physically transferring, by local lamination, the areas of the pre-made reflective layer to the portions of the protruding areas of the transparent microspheres with which the areas of the pre-made reflective layer are in contact, so that the physically transferred areas of the pre-made reflective layer are bonded to the portions of the protruding areas of the transparent microspheres;
  wherein during the physically transferring process the physically transferred areas of the pre-made reflective layer are detached from regions of the pre-made reflective layer that previously laterally surrounded the physically transferred areas with the regions of the pre-made reflective layer that previously laterally surrounded the physically transferred areas not being transferred so as to not be present in the retroreflective article;
then,
  disposing a binder precursor on a major side of the carrier layer that bears the transparent microspheres; and,
  solidifying the binder precursor to form a retroreflective article comprising a binder layer and in which the physically transferred areas of the pre-made reflective layer are embedded between the transparent microspheres and the binder layer.

17. The method of claim 16 wherein the retroreflective article provided by the method comprises at least some transparent microspheres that do not comprise any reflective layer disposed thereon, and wherein transparent microspheres that comprise physically transferred areas of the pre-made reflective layer embedded between the transparent microspheres and the binder layer, make up from at least 10 percent to at most 95 percent of the total number of transparent microspheres of the retroreflective article.

18. The method of claim 16 wherein the binder layer comprises a fluorescent pigment.

19. The method of claim 16 further comprising disposing an adhesive layer onto a major side of the binder layer, wherein the major side of the binder layer upon which the adhesive layer is disposed is opposite the side of the binder layer bearing the transparent microspheres and wherein the adhesive layer is chosen from the group consisting of a pressure-sensitive adhesive and a heat-activated adhesive.

20. The method of claim 19 wherein the carrier layer remains in place during the disposing of the adhesive layer onto the major side of the binder layer, and wherein the method comprises a further step of adhesively bonding the adhesive layer to a substrate chosen from the group consisting of a support layer and a fabric of a garment.

\* \* \* \* \*